(12) United States Patent
Moriki et al.

(10) Patent No.: US 8,429,669 B2
(45) Date of Patent: Apr. 23, 2013

(54) VIRTUAL MACHINE SWITCHING CONTROL BY PREFETCHING INFORMATION OUT OF AND UPDATING A SET OF PROCESSOR CONTROL INFORMATION BASED ON A BITMAP HAVING UPDATE STATUS

(75) Inventors: Toshiomi Moriki, Kokubunji (JP); Naoya Hattori, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 783 days.

(21) Appl. No.: 12/609,318

(22) Filed: Oct. 30, 2009

(65) Prior Publication Data
US 2010/0115513 A1     May 6, 2010

(30) Foreign Application Priority Data

Oct. 30, 2008 (JP) ................................. 2008-279973

(51) Int. Cl.
*G06F 9/46* (2006.01)
*G06F 9/455* (2006.01)
*G06F 12/14* (2006.01)

(52) U.S. Cl.
USPC .................................. 718/108; 718/1; 726/17

(58) Field of Classification Search .......................... None
See application file for complete search history.

(56) References Cited

U.S. PATENT DOCUMENTS

| | | | | |
|---|---|---|---|---|
| 4,253,145 A | * | 2/1981 | Goldberg | 703/21 |
| 7,685,635 B2 | * | 3/2010 | Vega et al. | 726/17 |
| 7,900,204 B2 | * | 3/2011 | Bennett et al. | 718/1 |
| 7,904,903 B2 | * | 3/2011 | Grobman et al. | 718/1 |
| 8,151,275 B2 | * | 4/2012 | Yokota | 718/108 |
| 2009/0007112 A1 | | 1/2009 | Moriki et al. | |

FOREIGN PATENT DOCUMENTS

WO    WO 03/104981 A2    12/2003

OTHER PUBLICATIONS

Uhlig et al; Intel Virtualization Technology, IEEE 0018-9162/05, 2005.*
Chapter 20 Introduction to Virtual-Machine Extensions Intel 64 and IA-32 Architectures Software Developer's Manual, Retrieved May 1, 2007; vol. 2B, pp. 1-34 www.intel.com/design/processor/manuals/253667.pdf.
AMD Virtualization (AMD-V), "Secure Virtual Machine" 24593 Rev.3.14 Sep. 2007; pp. 367-424 www.amd.com/jp-ja/assets/content_type/DownloadableAssets/jp-ja_AMD-V_general_200702.pdf.

(Continued)

*Primary Examiner* — Meng An
*Assistant Examiner* — Bing Zhao
(74) *Attorney, Agent, or Firm* — Antonelli, Terry, Stout & Kraus, LLP.

(57) ABSTRACT

Provided is a virtual machine including a first virtualization module operating on a physical CPU, for providing a first CPU, and a second virtualization module operating on the first CPU, for providing second CPU. The second virtualization module includes first processor control information holding a state of the first CPU obtained at a time of execution of the user program. The first virtualization module includes second processor control information containing a state of the physical CPU obtained at the time of the execution of the second virtualization module, third processor control information containing a state of the physical CPU obtained at the time of the execution of the user program, and prefetch entry information in which information to be prefetched from the third processor control information is set, and, upon detection of a event, the information set in the prefetch entry information is reflected to the first processor control information.

10 Claims, 18 Drawing Sheets

OTHER PUBLICATIONS

Intel Virtualization Technology Specification for the Intel Itanium Architecture (VT-i), Revision 2.0, URL.download.intel.com/design/Itanium/manuals/24531705.pdf; Apr. 2005, pp. 1-18.

Robert P. Goldberg, "Survey of Virtual Machine Research", vol. 7, No. 6, Jun. 1, 1974, pp. 34-45.

* cited by examiner

FIG. 7

LIST OF REASONS FOR VM-EXIT ON IA-32 (VT-X) CPU

| VM-EXIT REASON | DESCRIPTION | DETERMINATION | | CONDITION OF NOTIFYING GUEST VMM OF VM-EXIT |
|---|---|---|---|---|
| | | VM-EXIT CAUSED BY VM-ENTRY (1361) | VM-EXIT CAUSED BY VMCLEAR (1362) | (1363) |
| 0 | EXCEPTION OR NON-MASKABLE INTERRUPT(NMI) | | | |
| 1 | EXTERNAL INTERRUPT | | | ○ |
| 2 | TRIPLE FAULT | | | ○ |
| 3 | INIT SIGNALED | | | ○ |
| 4 | START-UP IPI (SIPI) | | | ○ |
| 5 | SMI | | | ○ |
| 6 | OTHER SMI | | | ○ |
| 7 | INTERRUPT WINDOW | | | DEPENDING ON SETTING IN GUEST VMCS(*1) |
| 9 | TASK SWITCH | | | ○ |
| 10 | CPUID | | | ○ |
| 12 | HLT | | | DEPENDING ON SETTING IN GUEST VMCS(*1) |
| 13 | INVD | | | ○ |
| 14 | INVLPG | | | DEPENDING ON SETTING IN GUEST VMCS(*1) |
| 15 | RDPMC | | | DEPENDING ON SETTING IN GUEST VMCS(*1) |
| 16 | RDTSC | | | DEPENDING ON SETTING IN GUEST VMCS(*1) |
| 17 | RSM | | | ○ |
| 18 | VMCALL | | | ○ |
| 19 | VMCLEAR | | ○ | |

EXIT REASON (1360)

(*1) CONDITIONS OF NOTICE VARY DEPENDING ON SET VALUES OF VM EXECUTION CONTROL FIELD OR THE LIKE IN GUEST VMCS.

1231 PREFETCH ENTRY INFORMATION

PREFETCH ENTRIES FOR EACH EXIT REASON (+) — 12313

| VMCS FIELD (*) | | 0 EXCEPTION OR NMI | 1 EXTERNAL INTERRUPT | 2 TRIPLE FAULT | 3 INIT SIGNAL | 4 START-UP IPI (SIPI) | 5 I/O SMI | 6 OTHER SMI | 7 INTERRUPT WINDOW | 8 NMI WINDOW | 9 TASK SWITCH | 1 0 CPUID | 1 1 GETSEC | 1 2 HLT | 1 3 INVD | 1 4 INVLPG | 1 5 RDPMC | 1 6 RDTSC | 1 7 RSM | 1 8 VMCALL | 1 9 VMCLEAR |
|---|---|---|---|---|---|---|---|---|---|---|---|---|---|---|---|---|---|---|---|---|---|
| GUEST-STATE AREA | CS | 1 | 0 | 0 | 0 | 0 | 0 | 0 | 0 | 0 | 0 | 0 | 0 | 0 | 0 | 0 | 0 | 0 | 0 | 0 | 0 |
| | DS | 1 | 0 | 0 | 0 | 0 | 0 | 0 | 0 | 0 | 0 | 0 | 0 | 0 | 0 | 0 | 0 | 0 | 0 | 0 | 0 |
| | RFLAGS | 1 | 1 | 0 | 0 | 0 | 0 | 0 | 1 | 0 | 0 | 1 | 0 | 1 | 0 | 1 | 0 | 0 | 0 | 0 | 0 |
| | RIP | 1 | 1 | 0 | 0 | 0 | 0 | 0 | 1 | 0 | 0 | 1 | 0 | 1 | 0 | 1 | 0 | 0 | 0 | 0 | 0 |
| | OTHER FIELDS | 0 | 0 | 0 | 0 | 0 | 0 | 0 | 0 | 0 | 0 | 0 | 0 | 0 | 0 | 0 | 0 | 0 | 0 | 0 | 0 |
| HOST-STATE AREA | | 0 | 0 | 0 | 0 | 0 | 0 | 0 | 0 | 0 | 0 | 0 | 0 | 0 | 0 | 0 | 0 | 0 | 0 | 0 | 0 |
| VM-EXECUTION CONTROL FIELD | | 0 | 0 | 0 | 0 | 0 | 0 | 0 | 0 | 0 | 0 | 0 | 0 | 0 | 0 | 0 | 0 | 0 | 0 | 0 | 0 |
| VM-EXIT CONTROL FIELD | | 0 | 0 | 0 | 0 | 0 | 0 | 0 | 0 | 0 | 0 | 0 | 0 | 0 | 0 | 0 | 0 | 0 | 0 | 0 | 0 |
| VM-ENTRY CONTROL FIELD | | 0 | 0 | 0 | 0 | 0 | 0 | 0 | 0 | 0 | 0 | 0 | 0 | 0 | 0 | 0 | 0 | 0 | 0 | 0 | 0 |

12311 / 12312

(*) MEANING OF ENTRY:
0: NO PREFETCH UPON VIRTUAL VM-EXIT
1: PREFETCH UPON VIRTUAL VM-EXIT

1231 PREFETCH ENTRY INFORMATION

PREFETCH ENTRIES FOR EACH EXIT REASON (+) — 12313

| VMCS FIELD(*) | | 20 VMLAUNCH | 21 VMPTRLD | 22 VMPTRST | 23 VMREAD | 24 VMRESUME | 25 VMWRITE | 26 VMXOFF | 27 VMXON | 28 CONTROL-REGISTER ACCESSES | 29 MOV DR | 30 I/O INSTRUCTION | 31 RDMSR | 32 WRMSR | 33 VM-ENTRY FAILURE (GUEST STATE) | 34 VM-ENTRY FAILURE (MSR LOADING) | 36 MWAIT | 39 MONITOR | 40 PAUSE | 41 VM-ENTRY FAILURE (MCA) | 43 TPR BELOW THRESHOLD | 44 APIC ACCESS | 54 WBINVD | 55 XSETBV |
|---|---|---|---|---|---|---|---|---|---|---|---|---|---|---|---|---|---|---|---|---|---|---|---|---|
| GUEST-STATE AREA | CS | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| | DS | 0 | 0 | 0 | 0 | 0 | 0 | 0 | 0 | 1 | 1 | 0 | 0 | 0 | 0 | 0 | 0 | 0 | 0 | 0 | 0 | 1 | 0 | 0 |
| | RFLAGS | 0 | 0 | 0 | 0 | 0 | 0 | 0 | 0 | 1 | 1 | 1 | 0 | 0 | 0 | 0 | 0 | 0 | 0 | 0 | 0 | 1 | 0 | 0 |
| | RIP | 0 | 0 | 0 | 0 | 0 | 0 | 0 | 0 | 1 | 1 | 1 | 0 | 0 | 0 | 0 | 0 | 0 | 0 | 0 | 0 | 1 | 0 | 0 |
| | OTHER FIELDS | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| HOST-STATE AREA | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| VM-EXECUTION CONTROL FIELD | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| VM-EXIT CONTROL FIELD | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| VM-ENTRY CONTROL FIELD | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

12312 / 12311

(+) MEANING OF ENTRY:
0: NO PREFETCH UPON VIRTUAL VM-EXIT  1: PREFETCH UPON VIRTUAL VM-EXIT

FIG. 10A

1231 PREFETCH ENTRY INFORMATION

PREFETCH ENTRIES FOR EACH EXIT REASON (+) — 12313

| # | Exit Reason | VM-INSTRUCTION ERROR | EXIT REASON | VM-EXIT INTERRUPTION INFORMATION | VM-EXIT INTERRUPTION ERROR CODE | IDT-VECTORING INFORMATION FIELD | IDT-VECTORING ERROR CODE | VM-EXIT INSTRUCTION LENGTH | VM-EXIT INSTRUCTION INFORMATION | EXIT QUALIFICATION | I/O RCX | I/O RSI | I/O RDI | I/O RIP | GUEST LINEAR ADDRESS |
|---|---|---|---|---|---|---|---|---|---|---|---|---|---|---|---|
| 0 | EXCEPTION OR NMI | 0 | 1 | 1 | 1 | 1 | 0 | 0 | 0 | 1 | 0 | 0 | 0 | 0 | 0 |
| 1 | EXTERNAL INTERRUPT | 0 | 1 | 1 | 0 | 0 | 0 | 0 | 0 | 0 | 0 | 0 | 0 | 0 | 0 |
| 2 | TRIPLE FAULT | 0 | 1 | 0 | 0 | 0 | 0 | 0 | 0 | 0 | 0 | 0 | 0 | 0 | 0 |
| 3 | INIT SIGNAL | 0 | 1 | 0 | 0 | 0 | 0 | 0 | 0 | 0 | 0 | 0 | 0 | 0 | 0 |
| 4 | START-UP IPI (SIPI) | 0 | 1 | 0 | 0 | 0 | 0 | 0 | 0 | 0 | 0 | 0 | 0 | 0 | 0 |
| 5 | I/O SMI | 0 | 1 | 0 | 0 | 0 | 0 | 0 | 0 | 0 | 0 | 0 | 0 | 0 | 0 |
| 6 | OTHER SMI | 0 | 1 | 0 | 0 | 0 | 0 | 0 | 0 | 0 | 0 | 0 | 0 | 0 | 0 |
| 7 | INTERRUPT WINDOW | 0 | 1 | 0 | 0 | 0 | 0 | 0 | 0 | 0 | 0 | 0 | 0 | 0 | 0 |
| 8 | NMI WINDOW | 0 | 1 | 0 | 0 | 0 | 0 | 0 | 0 | 0 | 0 | 0 | 0 | 0 | 0 |
| 9 | TASK SWITCH | 0 | 1 | 0 | 0 | 0 | 0 | 0 | 0 | 1 | 0 | 0 | 0 | 0 | 0 |
| 10 | CPUID | 0 | 1 | 0 | 0 | 0 | 0 | 1 | 0 | 0 | 0 | 0 | 0 | 0 | 0 |
| 11 | GETSEC | 0 | 1 | 0 | 0 | 0 | 0 | 1 | 0 | 0 | 0 | 0 | 0 | 0 | 0 |
| 12 | HLT | 0 | 1 | 0 | 0 | 0 | 0 | 1 | 0 | 0 | 0 | 0 | 0 | 0 | 0 |
| 13 | INVD | 0 | 1 | 0 | 0 | 0 | 0 | 1 | 0 | 0 | 0 | 0 | 0 | 0 | 0 |
| 14 | INVLPG | 0 | 1 | 0 | 0 | 0 | 0 | 1 | 0 | 1 | 0 | 0 | 0 | 0 | 0 |
| 15 | RDPMC | 0 | 1 | 0 | 0 | 0 | 0 | 1 | 0 | 0 | 0 | 0 | 0 | 0 | 0 |
| 16 | RDTSC | 0 | 1 | 0 | 0 | 0 | 0 | 1 | 0 | 0 | 0 | 0 | 0 | 0 | 0 |
| 17 | RSM | 0 | 1 | 0 | 0 | 0 | 0 | 1 | 0 | 0 | 0 | 0 | 0 | 0 | 0 |
| 18 | VMCALL | 0 | 1 | 0 | 0 | 0 | 0 | 1 | 1 | 0 | 0 | 0 | 0 | 0 | 0 |

VMCS FIELD — 12311

VM-EXIT INFORMATION FIELD — 12312

| 1231 PREFETCH ENTRY INFORMATION | | | | | | | | | | | | | | | | | |
|---|---|---|---|---|---|---|---|---|---|---|---|---|---|---|---|---|---|
| VMCS FIELD | | PREFETCH ENTRIES FOR EACH EXIT REASON(+) 12313 | | | | | | | | | | | | | | | |
| | | 19 VMCLEAR | 0 | 1 | 0 | 0 | 0 | 0 | 0 | 0 | 0 | 0 | 0 | 0 | 0 | 0 | 0 |
| | | 20 VMLAUNCH | 0 | 1 | 0 | 0 | 0 | 0 | 0 | 0 | 0 | 0 | 0 | 0 | 0 | 0 | 0 |
| | | 21 VMPTRLD | 0 | 1 | 0 | 0 | 0 | 0 | 0 | 0 | 0 | 0 | 0 | 0 | 0 | 0 | 0 |
| | | 22 VMPTRST | 0 | 1 | 0 | 0 | 0 | 0 | 0 | 0 | 0 | 0 | 0 | 0 | 0 | 0 | 0 |
| | | 23 VMREAD | 0 | 1 | 0 | 0 | 0 | 0 | 0 | 0 | 0 | 0 | 0 | 0 | 0 | 0 | 0 |
| | | 24 VMRESUME | 0 | 1 | 0 | 0 | 0 | 0 | 0 | 0 | 0 | 0 | 0 | 0 | 0 | 0 | 0 |
| | | 25 VMWRITE | 0 | 1 | 0 | 0 | 0 | 0 | 0 | 0 | 0 | 0 | 0 | 0 | 0 | 0 | 0 |
| | | 26 VMXOFF | 0 | 1 | 0 | 0 | 0 | 0 | 0 | 0 | 0 | 0 | 0 | 0 | 0 | 0 | 0 |
| | | 27 VMXON | 0 | 1 | 0 | 0 | 0 | 0 | 0 | 0 | 0 | 0 | 0 | 0 | 0 | 0 | 0 |
| | | 28 CONTROL-REGISTER ACCES | 0 | 1 | 0 | 0 | 0 | 0 | 1 | 0 | 1 | 0 | 0 | 0 | 0 | 0 | 0 |
| | | 29 MOV DR | 0 | 1 | 0 | 0 | 0 | 0 | 1 | 0 | 1 | 0 | 0 | 0 | 0 | 0 | 0 |
| | | 30 I/O INSTRUCTION | 0 | 1 | 0 | 0 | 0 | 0 | 1 | 0 | 1 | 0 | 0 | 0 | 0 | 0 | 0 |
| | | 31 RDMSR | 0 | 1 | 0 | 0 | 0 | 0 | 0 | 0 | 0 | 0 | 0 | 0 | 0 | 0 | 0 |
| | | 32 WRMSR | 0 | 1 | 0 | 0 | 0 | 0 | 0 | 0 | 0 | 0 | 0 | 0 | 0 | 0 | 0 |
| | | 33 VM-ENTRY FAILURE (GUEST STATE) | 0 | 1 | 0 | 0 | 0 | 0 | 0 | 0 | 0 | 0 | 0 | 0 | 0 | 0 | 0 |
| | | 34 VM-ENTRY FAILURE (MSR LOADING) | 0 | 1 | 0 | 0 | 0 | 0 | 0 | 0 | 0 | 0 | 0 | 0 | 0 | 0 | 0 |
| | | 36 MWAIT | 0 | 1 | 0 | 0 | 0 | 0 | 1 | 0 | 0 | 0 | 0 | 0 | 0 | 0 | 0 |
| | | 39 MONITOR | 0 | 1 | 0 | 0 | 0 | 0 | 1 | 0 | 0 | 0 | 0 | 0 | 0 | 0 | 0 |
| | | 40 PAUSE | 0 | 1 | 0 | 0 | 0 | 0 | 1 | 0 | 0 | 0 | 0 | 0 | 0 | 0 | 0 |
| | | 41 VM-ENTRY FAILURE (MCA) | 0 | 1 | 0 | 0 | 0 | 0 | 0 | 0 | 0 | 0 | 0 | 0 | 0 | 0 | 0 |
| | | 43 TPR BELOW THRESHOLD | 0 | 1 | 0 | 0 | 0 | 0 | 0 | 0 | 0 | 0 | 0 | 0 | 0 | 0 | 0 |
| | | 44 APIC ACCESS | 0 | 1 | 0 | 0 | 0 | 0 | 0 | 0 | 1 | 0 | 0 | 0 | 0 | 0 | 0 |
| | | 54 WBINVD | 0 | 1 | 0 | 0 | 0 | 0 | 1 | 0 | 0 | 0 | 0 | 0 | 0 | 0 | 0 |
| | | 55 XSETBV | 0 | 1 | 0 | 0 | 0 | 0 | 1 | 0 | 0 | 0 | 0 | 0 | 0 | 0 | 0 |
| | 12311 | 12312 | VM-INSTRUCTION ERROR | EXIT REASON | VM-EXIT INTERRUPTION INFORMATION | VM-EXIT INTERRUPTION ERROR CODE | IDT-VECTORING INFORMATION FIELD | IDT-VECTORING ERROR CODE | VM-EXIT INSTRUCTION LENGTH | VM-EXIT INSTRUCTION | EXIT QUALIFICATION | I/O RCX | I/O RSI | I/O RDI | I/O RIP | GUEST LINEAR ADDRESS |
| | | VM-EXIT INFORMATION FIELD | | | | | | | | | | | | | | | |

FIG. 10B

227 UPDATE BITMAP

| GUEST VMCS FIELD(*) | | UPDATE BITMAP INFORMATION (+) | |
|---|---|---|---|
| | | UPDATED | DIRTY |
| GUEST-STATE AREA | CS | 0 | 0 |
| | DS | 0 | 0 |
| | RFLAGS | 1 | 0 |
| | RIP | 1 | 0 |
| | OTHER FIELDS | 0 | 0 |
| HOST-STATE AREA | | 0 | 0 |
| VM-EXECUTION CONTROL FIELD | | 0 | 0 |
| VM-EXIT CONTROL FIELD | | 0 | 0 |
| VM-ENTRY CONTROL FIELD | | 0 | 0 |
| VM-EXIT INFORMATION FIELD | VM-INSTRUCTION ERROR | 0 | 0 |
| | EXIT REASON | 1 | 0 |
| | VM-EXIT INTERRUPTION INFORMATION | 1 | 0 |
| | VM-EXIT INTERRUPTION ERROR CODE | 0 | 0 |
| | IDT-VECTORING INFORMATION FIELD | 0 | 0 |
| | IDT-VECTORING ERROR CODE | 0 | 0 |
| | VM-EXIT INSTRUCTION LENGTH | 0 | 0 |
| | VM-EXIT INSTRUCTION INFORMATION | 0 | 0 |
| | EXIT QUALIFICATION | 0 | 0 |
| | I/O RCX | 0 | 0 |
| | I/O RSI | 0 | 0 |
| | I/O RDI | 0 | 0 |
| | I/O RIP | 0 | 0 |
| | GUEST LINEAR ADDRESS | 0 | 0 |

2271  2272  2273  2274

(+) Updated ... 1; INFORMATION OF SHADOW VMCS HAS BEEN REFLECTED TO CORRESPONDING GUEST VMCS FIELD
            0; INFORMATION OF SHADOW VMCS HAS NOT BEEN REFLECTED TO CORRESPONDING GUEST VMCS FIELD
Dirty   ... 1; GUEST VMM HAS WRITTEN INFORMATION (VMWRITE) TO CORRESPONDING GUEST VMCS FIELD
            0; GUEST VMM HAS NOT WRITTEN INFORMATION TO CORRESPONDING GUEST VMCS FIELD

FIG. 11

VIRTUAL MACHINE SWITCHING CONTROL BY PREFETCHING INFORMATION OUT OF AND UPDATING A SET OF PROCESSOR CONTROL INFORMATION BASED ON A BITMAP HAVING UPDATE STATUS

CLAIM OF PRIORITY

The present application claims priority from Japanese patent application JP2008-279973 filed on Oct. 30, 2008, the content of which is hereby incorporated by reference into this application.

BACKGROUND OF THE INVENTION

This invention relates to a virtual machine system, and more particularly, to a virtual machine system using a processor provided with a virtualization support feature.

Recently, as open servers have become popular, a larger number of servers have been introduced to information systems used in enterprises. Especially, indiscriminate introduction of Intel Architecture (IA)-32 servers, which have high cost performance, has increased the operation/management cost of servers, including the cost of power consumption and the cost of hardware maintenance, and is posing a problem for the enterprises which are operating the servers.

Server integration which, in order to reduce the operation/management cost of servers, integrates a plurality of servers into one physical server is promising. As a method for realizing the server integration, a virtualization software program for providing a feature of virtualizing computer resources is attracting attention. The virtualization software program is a control software program, which divides computer resources such as a CPU (processor) and I/Os of a single physical server, and assigns the divided computer resources to a plurality of virtual servers. On the respective virtual servers, one OS (guest OS) can operate. By employing the virtualization software program, it becomes possible to realize the server integration in which OSs and application programs that conventionally run on a plurality of physical servers are assigned to respective virtual servers, and a plurality of servers are provided on a single physical computer.

A description is now given of a policy of the virtualization software program for assigning computer resources to virtual servers. With regard to the assignment of the CPU as the computer resource, virtualization software programs for the IA-32 mainly employ a processor provided with the virtualization support feature such as virtualization technology for Xenon (VT-x) (or AMD-V). The VT-x has a feature which assigns different operation privileges between a virtualization software program and a guest OS, and is implemented as hardware of a processor, as disclosed in JP 2005-529401 A, Intel Corp., "Intel 64 and IA-32 Architectures Software Developer's Manual VOL 2B", retrieved on May 1, 2007, and Advanced Micro Devices, Inc., "AMD-Virtualization (AMD-V)", retrieved on May 1, 2007, for example. A CPU compliant with the VT-x feature detects the operation privilege switched between the guest OS and the virtualization software program, and backs up and restores a register state of the CPU, thereby providing independent operation environments for respective virtual servers.

On the other hand, a policy of the assignment of I/Os depends on virtualization software programs. The assignments of the I/Os by the virtualization software programs are generally classified into:

(1) direct I/O assignment type which permits direct use of I/O devices of a physical server; and (2) virtual I/O assignment type which hides types and revisions of I/O devices of a physical server.

The "direct I/O assignment type (1)" has an advantage that, for presently operating I/Os of a physical server, server integration can be easily realized without rebuilding a file system or the like. On the other hand, the "virtual I/O assignment type (2)" has an advantage that a fixed I/O configuration can be provided for guest OSs independently of I/O types of a physical server.

The following are known examples of the virtualization software programs described above. First, as a virtualization software program for an IA-32 server, ESX Server of VMware (registered trademark) is known. The ESX Server can cause a plurality of conventional OSs to operate on a physical server employing an IA-32 CPU by means of the above-mentioned VT-x feature.

As a virtualization software program based on a mainframe computer technology, a logical partition operation feature (in IBM System 370, for example) is known. This feature partitions a single physical computer into a plurality of logical partitions (LPARs), and causes a conventional OS and a virtual machine manager (VMM) to operate on the respective LPARs. With the logical partition operation feature, the mainframe (physical computer) uses a feature (LPAR mode) corresponding to the above-mentioned VT-x of IA-32 to cause the conventional OS and the VMM to run on the virtual server (LPAR).

Moreover, SimOS is known as a virtualization software program which provides the VT-x feature of the IA-32 by means of a simulator. A simulator of this type is a software program for providing functions of an arbitrary server and CPU by interpreting an instruction sequence of a guest OS on a virtual server.

Moreover, as a virtualization support feature implemented on an IA-64 processor (IPF: Itanium Processor Family), the VT-i feature described in Intel Corp., "Intel Virtualization Technology Specification for the Intel Itanium Architecture (VT-i)", retrieved on May 1, 2007, is known.

SUMMARY OF THE INVENTION

Considering the recent needs for the server integration, it has been studied to integrate the virtualization software feature of the "virtual I/O assignment type (2)" to a new-generation server OS such as Windows Server 2008.

However, the conventional virtualization software program has the following problems.

The conventional virtualization software program such as the ESX Server can cause a conventional OS to run on a plurality of virtual servers based on the virtualization support feature (VT-x) of a CPU constituting a physical computer, but the conventional virtualization software program cannot provide the virtual server with the VT-x feature. Therefore, the ESX Server has a problem that, on the ESX server, an OS incorporating a virtualization software program (virtualization feature), such as the new-generation server OS, is hard to execute.

Moreover, with the logical partition operation feature, an OS or a VMM on an LPAR cannot use the LPAR mode. Therefore, there poses a problem that an OS incorporating the virtualization software program is hard to operate on an LPAR.

Further, the above-mentioned simulator can provide a virtual server with the VT-x feature, and therefore can operate the new-generation OS incorporating the virtualization software program. However, the simulator interprets an instruction sequence of a virtual server (guest OS), and converts it into an instruction sequence executable on a CPU of a physical computer (carries out a binary translation), resulting in generation of an overhead, and a decrease in performance (processing performance) of the virtual server. Hence, it is not practical for the simulator to carry out the server integration which requires operation of a plurality of virtual servers.

Moreover, though a new-generation OS incorporating a virtualization feature of the virtual I/O assignment type is suitable for an application for generating a large number of virtual servers having the same I/O configuration, such as an application for providing a development environment, the new-generation OS is not suitable for an application for integrating conventional OSs operating on existing servers (OSs without the VT-x feature, such as NT servers). Particularly, software assets presently operated by enterprises are mostly software programs operating on OSs without a virtualization feature. Therefore, in a future server integration process, a server integration environment in which existing OSs without a virtualization feature and newly-introduced new-generation OSs with a virtualization feature coexist is necessary. However, as described above, the conventional art has had a problem that it is difficult to integrate new-generation OSs incorporating a virtualization feature on a virtual machine, and to integrate new-generation OSs and conventional OSs.

This invention has been made in view of the above-mentioned problems, and it is an object of this invention to provide a virtual machine capable of running an OS incorporating a virtualization feature on a virtual server without decreasing performance of the virtual machine.

A representative aspect of this invention is as follows.

A control method for a virtual machine system for providing, on a physical computer comprising a physical processor and a memory, a plurality of virtual processors, the virtual machine system comprising: a first virtualization module for providing a first virtual processor; a second virtualization module to be executed on the first virtual processor, for providing a second virtual processor; and a user program to be executed on the second virtual processor, the control method comprising the steps of: holding, by the second virtualization module, first processor control information containing a state of the first virtual processor obtained at a time of execution of one of the second virtualization module and the user program; holding, by the first virtualization module, second processor control information containing a state of the physical processor obtained at the time of the execution of the second virtualization module, third processor control information containing a state of the physical processor obtained at the time of the execution of the user program, and prefetch entry information in which information to be prefetched in a batch from the third processor control information is set in advance; detecting, by the first virtualization module, a first event for switching control from the user program to the second virtualization module on the second virtual processor; reading, by the first virtualization module, upon detection of the first event, the information set in the prefetch entry information out of the third processor control information; updating, by the first virtualization module, out of the first processor control information, information read based on the prefetch entry information; setting, by the first virtualization module, the second processor control information for the physical processor to switch the control to the second virtualization module; and referring to, by the second virtualization module, the first processor control information.

Therefore, according to this invention, when the second virtualization module refers to the first processor control information, the control is restrained from being switched from the second virtualization module to the first virtualization module, and hence it becomes possible to execute, without a reduction in performance of the virtual machine, the OS integrating the virtualization feature on a virtual server. Then, the first virtualization module reflects, based on the prefetch entry information, the third processor control information to the first processor control information, and hence the information to be referred to can be quickly read by the second virtualization module. As a result, it becomes possible to prevent the switch of the control from the second virtualization module to the first virtualization module from occurring frequently, resulting in prevention of a decrease in performance of the virtual machine system.

BRIEF DESCRIPTION OF THE DRAWINGS

FIG. 7 shows an embodiment of this invention, and is an explanatory diagram illustrating an example of a list of the reasons for the VM-exit.

FIG. 9A, shows an embodiment of this invention, and is a map showing an example of a first part of the prefetch entry information 1231.

FIG. 9B, shows an embodiment of this invention, and is a map showing an example of a last part of the prefetch entry information 1231.

FIG. 10A, shows an embodiment of this invention, and is a map showing an example of a first part of the prefetch entry information 1231.

FIG. 10B shows an embodiment of this invention, and is a map showing an example of a last part of the prefetch entry information 1231.

FIG. 11 shows an embodiment of this invention, and is a map showing an example of the update bitmap 227.

DETAILED DESCRIPTION OF THE PREFERRED EMBODIMENT

A description is now given of an embodiment of this invention with reference to accompanying drawings.

Figure 1:
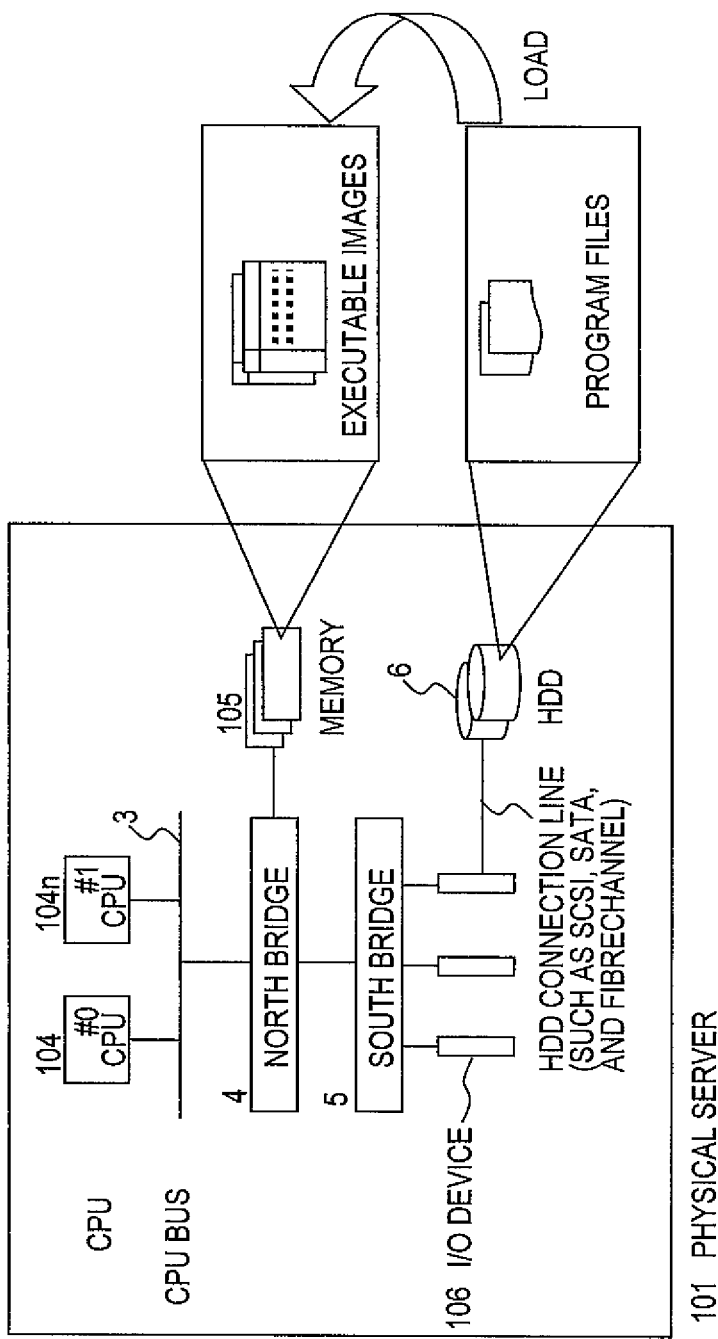
FIG. 1 illustrates an embodiment of this invention, and is a block diagram of a computer system to which this invention is applied.

FIG. 1 illustrates an embodiment of this invention, and is a block diagram of a computer system to which this invention is applied. A physical server (physical computer) 101 is mainly constructed by physical CPUs (processors) 104 and 104n provided with a virtualization support feature for carrying out arithmetic operations, a memory 105 for storing data and programs, and an I/O device 106 for transmitting/receiving data to/from devices external to the physical server 101.

The physical CPUs 104, 104n are connected to a north bridge 4 provided with a memory controller, thereby making access to the memory 105. The north bridge 4 is connected to a south bridge 5 connected to the I/O device 106, thereby enabling the physical CPUs 104, 104n to make access to the I/O devices 106. One of the I/O devices 106 is connected, via a connection line, to a hard disk drive (HDD) 6 serving as a machine-readable storage medium. The HDD 6 stores programs such as a virtual machine manager, an OS, and application programs, which are described later, and the physical CPUs 104, 104n load programs in the HDD 6 to the memory 105, expand executable images on the memory 105, and execute the executable images. The I/O devices 106 are constructed by a network interface, host bus adaptor, and the like.

Moreover, the physical CPU 104 may be constructed by an arbitrary number (of sockets) of CPUs or by a processor provided with a plurality of processing cores. Moreover, the virtualization support feature (virtual machine extensions: VMX) of the physical CPU 104 includes the above-mentioned virtualization technology for IA-32 processors (VT-x). It should be noted that an operation mode using the virtualization support feature is a VMX mode, and an operation mode without using the virtualization support feature on a normal privilege level is a normal operation mode.

Figure 2:
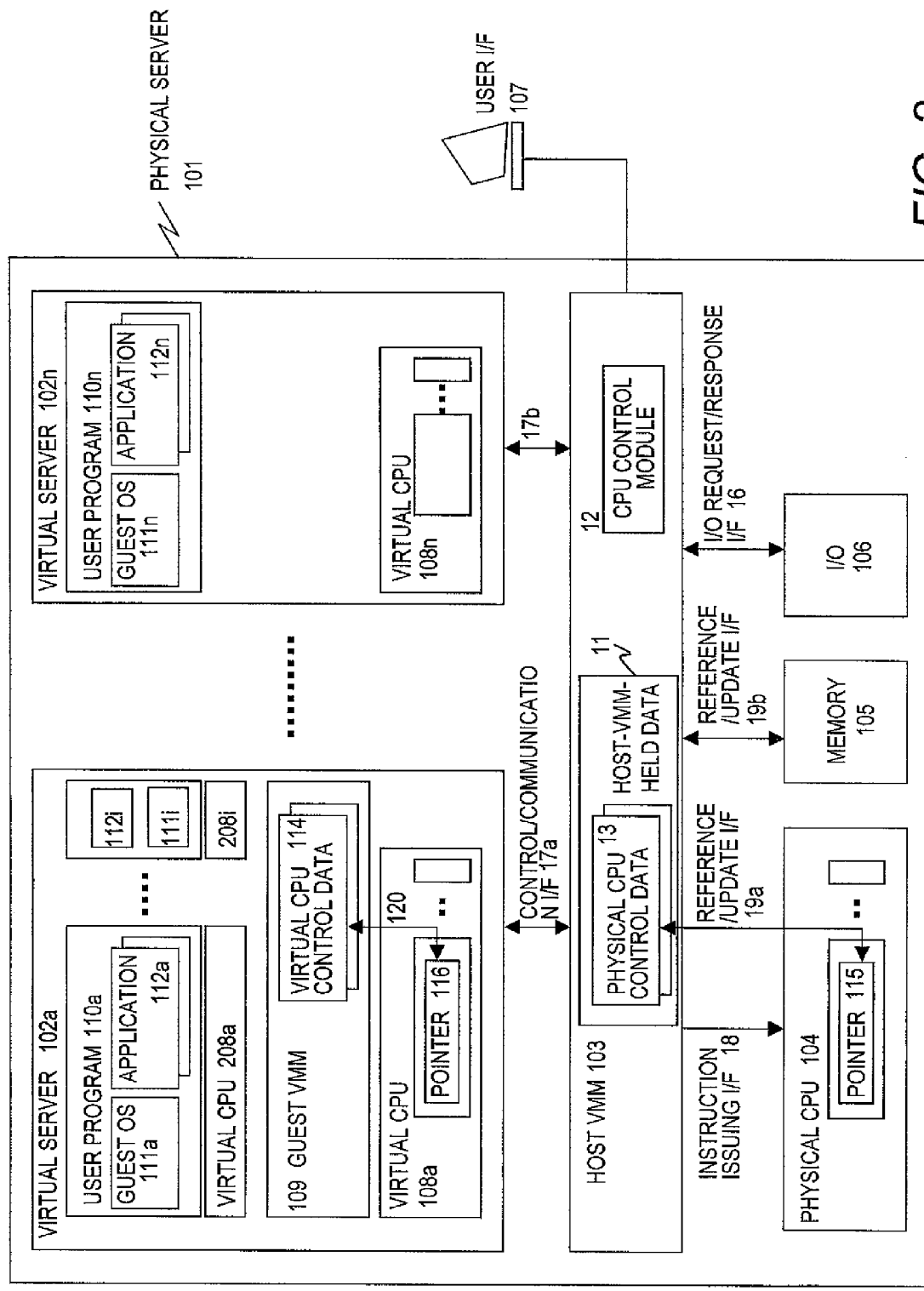
FIG. 2 shows an embodiment of this invention, and is a block diagram of a virtual machine system to which this invention is to be applied.

FIG. 2 is a block diagram of a virtual machine system to which this invention is to be applied. FIG. 2 illustrates an example in which virtual machines are executed on the physical CPU 104 illustrated in FIG. 1.

On the physical server 101, in order to operate a plurality of virtual servers 102a to 102n, a host virtual machine manager (VMM) 103 is executed for converting physical computer resources of the physical server 101 into virtualized computer resources, and assigning the virtualized computer resources to the respective virtual servers 102a to 102n. This host VMM 103 (first virtualization module) is provided as a program which is read to the memory 105 and then executed by the physical CPU 104.

The host VMM 103 provides the respective virtual servers 102a to 102n with virtual CPUs 108a to 108n, and assigns the memory 105 and the I/O device 106 to the respective virtual servers 102a to 102n. A well-known or publicly-known method may be properly used for assigning the computer resources of the physical server 101 to the respective virtual servers 102a to 102n, and hence a detailed description thereof is omitted.

The physical server 101 is connected to a management console 107 providing a user interface, and an administrator or the like enters setting such as allocations of the computer resources for the virtual servers 102a to 102n or the like to the host VMM 103 via the user interface. Moreover, the user interface outputs setting states received from the host VMM 103 and the like on a display device of the management console 107.

On the virtual servers 102a to 102n running on the host VMM 103 of the physical server 101, grandchild OSs (guest OSs on the guest VMMs 109) 111a to 111n respectively run as the user programs 110a to 110n, and application programs 112a to 112n are respectively executed on the grandchild OSs 111a to 111n. The grandchild OSs 111a to 111n are respectively executed on the virtual CPUs 108a to 108n provided by the host VMM 103. It should be noted that the virtual CPUs 108a to 108n allow assignment of a plurality of virtual CPUs to a single virtual server.

On the virtual server 102a, a new-generation OS incorporating the virtualization feature (guest VMM 109) is executed as the grandchild OS 111a, and on the virtual server 102n, a conventional OS (such as NT Server) without a virtualization feature is executed as the grandchild OS 111n.

The host VMM 103 assigns the virtual CPU 108n and computer resources set via the management console 107 to the virtual server 102n executing the conventional OS, thereby executing the grandchild OS 111n and the application program 112n.

On the other hand, the host VMM 103 provides the virtual CPU 108a to be assigned to the virtual server 102a executing the new-generation OS 111a with the virtualization support feature. On the virtual CPU 108a, the guest VMM (second virtualization module) 109 is running, and this guest VMM 109 provides virtual CPUs 208a to 208i. On the virtual server 102a on which the new-generation OS is running, the plurality of second virtual CPUs 208a to 208i are provided on the first virtual CPU 108a, and, on the respective virtual CPUs 208a to 208i, a plurality of user programs 110a (grandchild OS 111a and application program 112a) to 110i (grandchild OS 111i and application program 112i) are executed. It should be noted that the host VMM 103 may generate the guest VMM 109.

In the following section of this first embodiment, a description is given of an example in which the physical CPU 104 has the VT-x feature, and the grandchild OS 111a of the virtual server 102a is the new-generation OS incorporating the virtualization feature (guest VMM 109).

Figure 3:
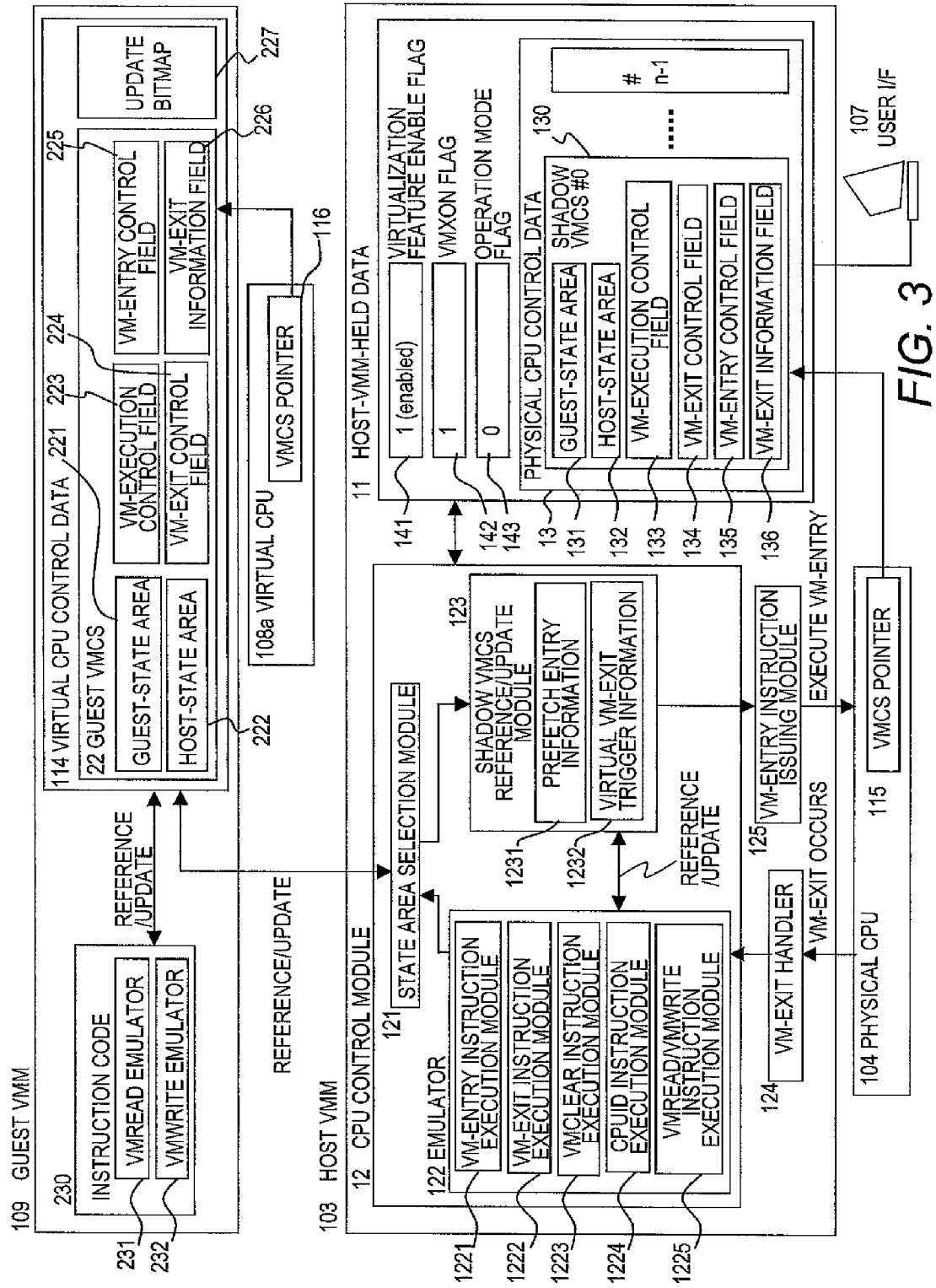
FIG. 3 shows an embodiment of this invention, and is a block diagram illustrating functions of the host VMM 103 and the guest VMM 109.
Figure 5:
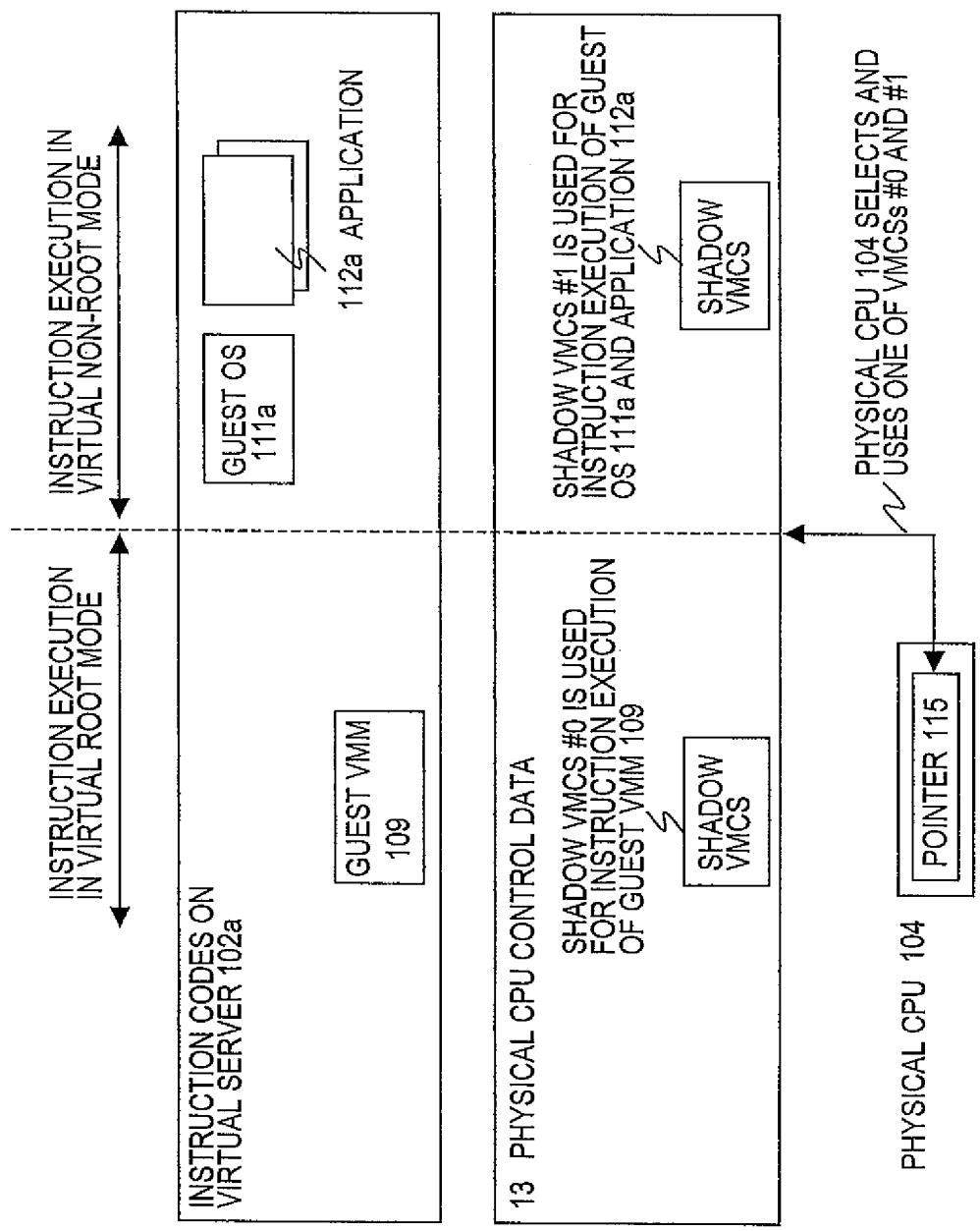
FIG. 5 shows an embodiment of this invention, and is a map showing a relationship between the shadow VMCSs #0, #1 used by the physical CPU 104 and the operation modes of the VT-x feature.

The host VMM 103 using the VT-x feature stores host-VMM-held data 11 for storing states of the virtual servers 102a to 102n and control information used for controlling the physical CPU 104 in a predetermined field of the memory 105. Then, in the host-VMM-held data 11, physical CPU control data 13 used for controlling the physical. CPU 104 is stored. The physical CPU control data 13 is a data structure representing a status of the virtual CPU 108a using the virtualization support feature, and is referred to as virtual machine control structure (VMCS). According to this embodiment, as illustrated in FIG. 3, the physical. CPU control data 13 in the host-VMM-held data 11 are shadow VMCSs 130 (#0 to #n−1), virtual CPU control data 114 handled by the guest VMM 109 is a guest VMCS 22 (first processor control information), and the shadow VMCSs 130 and the guest VMCS 22 are distinguished from each other. Moreover, the physical CPU 104 has a pointer 115 used to refer to the shadow VMCSs 130 (#0 to #n−1) in the physical CPU control data 13. Further, as illustrated in FIG. 5, the shadow VMCS 130 according to this invention provides one guest VMM 109 with a shadow VMCS #0 accessible in the VMX root mode, and a shadow VMCS #1 accessible in the VMX non-root mode. In the following description, the shadow VMCSs are generally referred to as shadow VMCS 130, and, when individual shadow VMCSs are to be identified, the shadow VMCSs are denoted by shadow VMCSs #0 to #n−1. It should be noted that FIG. 5 is a map showing a relationship between the shadow VMCSs #0, #1 used by the physical CPU 104 and the operation modes of the VT-x feature. The host VMM 103 sets, by rewriting the shadow VMCSs 130 (#0 to #n−1) in the physical CPU control data 13, an operation mode of the physical CPU 104 to any one of an operation mode (VMX non-root mode) for executing the user program 110*a* or the guest VMM 109 and an operation mode (VMX root mode) for executing the host VMM 103.

On the virtual server 102*a*, the virtualization feature (virtualization software program) integrated into the grandchild OS 111*a*, which is the new-generation OS, runs as the guest VMM 109 on the virtual CPU 108*a* provided by the host VMM 103.

The guest VMM 109 is provided with the virtual CPU control data 114 containing the guest VMCS 22 for controlling the virtualization support feature of the virtual CPU 108*a*, an update bitmap 227 indicating update states of the shadow VMCS 130, and instruction code 230 emulating read/write from/to the guest VMCS 22. The guest VMCS 22 and the update bitmap 227 are stored in a predetermined field of the memory 105 assigned by the host VMM 103.

Moreover, the virtual CPU 108*a* has a pointer 116 used to refer to the virtual CPU control data 114 (guest VMCS 22) of the guest VMM 109. This pointer 116 is a pointer pointing to the control data structure (guest VMCS 22) of the virtual CPU 108*a* corresponding to the VT-x feature held by the grandchild OS 111*a*, and is initialized when a VMPTRLD instruction (instruction to cause the processor to read the memory secured for the VMCS) is issued by the grandchild OS 111*a*. It should be noted that the pointer 116 is initialized by the guest VMM 109.

In FIG. 2, the virtual CPUs 208*a* to 208*l* of the virtual server 102*a* on which the new-generation OS is running are provided by the guest VMM 109 integrated into the new-generation OS 111*a*, and the user programs 110*a* to 110*i* can be executed on the respective virtual CPUs 208*a* to 208*i*. It should be noted that the guest VMM 109 of the virtual server 102*a* may serve as an add-in software program of the grandchild OS 111*a*.

OVERVIEW OF THIS INVENTION

The VT-x feature for supporting the virtualization controls the operation mode of the physical CPU 104 by using the shadow VMCS secured by the host VMM 103 on the memory 105 of the physical server 101. The physical CPU 104 having the VT-x feature as the virtualization support feature has the normal operation mode and the virtual machine extensions (VMX) mode for providing the virtualization support feature, and, in the VMX mode, switches the mode to one of a host mode (hereinafter, VMX root mode) in which the host VMM 103 operates and a guest mode (hereinafter, VMX non-root mode) in which the guest VMM 109 or the user program (grandchild OS 111*a* or application program 112*a*) operates.

The shadow VMCS 130 of the physical CPU control data 13 has only one type of field (guest-state area 131) specifying the operation state of the user program 110*a* on the virtual server 102*a*. Hence, it is impossible to simply distinguish which of the guest VMM 109, which is the virtualization feature of the new-generation OS, and the user program 110*a* (grandchild OS 111*a* or application program 112*a*) is operating.

In view of this, this invention focuses on a fact that a single virtual CPU does not execute the guest VMM 109 and the user program 110*a* at the same time. The host VMM 103 monitors the switch between the guest VMM 109 and the user program 110*a* of the virtual server 102*a* executing the grandchild OS 111*a* incorporating the virtualization feature, and rewrites the guest-state area 131 of the shadow VMCSs 130 (#0 to #n−1) of the host-VMM-held data 11 in switching the operation mode, thereby causing the virtualization feature to operate on the virtual server 102*a*.

Therefore, the host VMM 103 monitors the grandchild OS 111*a* which is the new generation OS incorporating the virtualization feature, thereby providing control which sets the operation mode of the physical CPU 104 to the VMX root mode in a period in which the host VMM 103 is operating, and to the VMX non-root mode in a period in which the guest VMM 109 or the user program 110*a* is operating. When the host VMM 103 enters into the VMX root mode due to a predetermined condition (VM-exit), the host VMM 103 emulates instructions of the guest VMM 109 or the grandchild OS. As a result, for the grandchild OS 111*a*, it appears that the virtual CPU 108*a* is providing the virtualization support feature.

Moreover, the transition of the physical CPU 104 from the VMX root mode to the VMX non-root mode is referred to as VM-entry, and, conversely, the transition from the VMX non-root mode to the VMX root mode is referred to as VM-exit. Upon the VM-exit due to a predetermined reason such as issuance of a privilege instruction (such as page fault) from the grandchild OSs 111*a* to 111*n*, the physical CPU 104 notifies the host VMM 103 of the VM-exit. The host VMM 103 detects the VM-exit or VM-entry as an event, thereby carrying out predetermined processes.

The transition between the VMX root mode and the VMX non-root mode of the VMX mode is carried out as described in "Intel 64 and IA-32 Architectures Software Developer's Manual VOL 2B". Thus, only a brief description is now given thereof. When the normal operation mode is switched to the VMX mode, the host VMM 103 issues a VMXON instruction, thereby switching the operation mode of the physical CPU 104 to the VMX mode. Then, the host VMM 103 in the VMX mode writes information used for executing the user program 110*a* in the shadow VMCSs (#0 to #n−1) of the corresponding virtual CPUs 108*a* to 108*n*, issues a VM-entry instruction (VMLAUNCH instruction or VMRESUME instruction), and switches from the VMX root mode to the VMX non-root mode.

On the other hand, the VM-exit is an event which occurs due to a predetermined reason such as issuance of an privilege instruction from the grandchild OSs 111*a* to 111*n*, and this event causes the physical CPU 104 to notify the host VMM 103 of the VM-exit, and, simultaneously, switches the operation mode from the VMX non-root mode to the VMX root mode.

When the CPU control module 12 of the host VMM 103 detects the VM-exit, the CPU control module 12 carries out a predetermined emulation, thereby completing a process of the guest VMM 109 or the grandchild OS, then rewrites the shadow VMCS 130 according to necessity, and again issues the VM-entry instruction (first control instruction) to switch the VMX root mode to the VMX non-root mode.

As described above, when the user program 110*a* executed on the virtual server 102*a* is switched between the guest VMM 109 and the grandchild OS 111*a*, the contents of the guest VMCS 22 are synchronized with the shadow VMCS 130 pointed by the pointer 115 of the physical CPU 104. The guest VMM 109, by making access to the virtual guest VMCS 22, can obtain and update statuses in the user program 110*a* and contents of events without making access to the shadow VMCS 130.

The physical CPU 104 having the VT-x feature provides, as instructions to carry out read/write from/to the shadow VMCS 130, a VMREAD instruction for reading the shadow VMCS 130 and a VMWRITE instruction for carrying out write to the shadow VMCS 130. It should be noted that the read from the shadow VMCS 130 (VMREAD instruction) and the write to the shadow VMCS 130 (VMWRITE) can be used only in the VMX root mode.

On this occasion, when the guest VMM 109 makes access to the guest VMCS 22, instead of requesting, by a physical VMREAD instruction or VMWRITE instruction, for access to the guest VMCS 22, a VMREAD emulator 231 or a VMWRITE emulator 232 set in advance in the instruction code 230 inside the guest VMM 109 is started. In the following description, the startup of the VMREAD emulator 231 or VMWRITE emulator 232 performed by the guest VMM 109 in place of the VMREAD instruction or VMWRITE instruction is referred to as issuance of a virtual VMREAD instruction or virtual VMWRITE instruction. Those instructions may be implemented by branch instructions, function call instructions, SYSCALL/SYSENTER, and software interrupts (INT3, INTO, INN, which operate with the user privilege, but other instructions which avoid occurrence of the physical VM-exit may replace them.

The guest VMM 109, upon reading the guest VMCS 22, issues a virtual VMREAD instruction, and, upon writing information to the guest VMCS 22, issues a virtual VMWRITE instruction.

If the guest VMM 109 issues the VMREAD instruction or the VMWRITE instruction in the VMX non-root mode, the VM-exit occurs in the physical. CPU 104 in the above-mentioned conventional example, and the guest VMM 109 switches to the VMX root mode, and then reads the guest VMCS 22. Then, if the guest VMM 109 issues a plurality of VMREAD instructions, the VM-exit occurs for each of the VMREAD instructions, and the switch to the VMX root mode frequently occurs, resulting in an increase in load on the physical CPU 104. As a result, a decrease in performance of the virtual machine system is of concern.

Though many types of information are stored in the shadow VMCS 130, limited information is accessed by the guest VMM 109 with the VMREAD or VMWRITE instruction, and information to be accessed can be predicted by reason information (basic reason) of the VM-exit. For example, a privilege exception such a page fault occurs on the grandchild OS 111*a*, information to be referred to by the VMREAD instruction is limited to IDT interruption information, IDT vectoring information, and the like in addition to the basic reason.

On the other hand, information to be accessed by the VMWRITE instruction is written and referred to at different timings. For example, when the guest VMM 109 writes information by means of the VMWRITE instruction to the guest VMCS 22, upon the transition to the grandchild OS 111*a* due to a next VM-entry, the guest VMCS 22 is referred to.

Therefore, according to this invention, the guest VMM 109 is caused to issue, in place of the physical VMREAD instruction or physical VMWRITE instruction, the virtual VMREAD instruction or virtual VMWRITE instruction. Then, the VMREAD emulator 231 or VMWRITE emulator 232 provided in the instruction code 230 of the guest VMM 109 is started, thereby providing access to the guest VMCS 22 without issuing the VM-exit instruction.

Then, the VMREAD emulator 231, only when the values of the guest VMCS 22 have not been updated by the values of the shadow VMCS 130, actually issues the VM-exit instruction, and reflects the values of the shadow VMCS 130 to the values of the guest VMCS 22, thereby reflecting the data requested by the virtual VMREAD instruction to a predetermined destination. As the predetermined destination, a general register or the memory is specified.

When the VM-exit occurs as described above, the host VMM 103, based on the exit reason of the VM-exit, predicts information to be accessed, and prefetches a plurality of pieces of the information, thereby reflecting them to the guest VMCS 22, which restrains the VM-exit from occurring for the case of the next virtual VMREAD instruction.

After the occurrence of the VM-exit, data requested with the virtual VMREAD instruction by the guest VMM 109 operating in the VMX non-root mode is data indicating an operation state of the user program 110*a*. This information is stored in the shadow VMCS #1 with the VM-exit as a trigger, and thus, the host VMM 103 carries out the prefetch directed to the shadow VMCS #1.

On this occasion, FIG. 5 is a map showing relationship between the shadow VMCSs #0, #1 used by the physical CPU 104 and the operation modes of the VT-x feature. To the shadow VMCS 130 of the host-VMM-held data 11, as fields used by the virtual server 102*a*, the shadow VMCS #0 used by the physical CPU 104 in the VMX (virtualization feature) root mode, and the shadow VMCS #1 used by the physical CPU 104 in the VMX (virtualization feature) non-root mode are set in advance.

The host VMM 103, by switching the pointer 115 of the physical CPU 104, switches between the shadow VMCSs #0 and #1. Both the shadow VMCSs #0 and #1 can be accessed only by the host VMM 103. On the other hand, the guest VMM 109 operating in the VMX non-root mode can access only the guest VMCS 22.

(Configuration of VMM)

In FIG. 2, the host VMM 103 includes, in addition to the host-VMM-held data 11 described above, the CPU (processor) control module 12 which monitors the virtual servers 102*a* to 102*n* and switches the operation mode of the physical CPU 104 to one of the VMX root mode and the VMX non-root mode.

Moreover, the host VMM 103 includes control/communication interfaces 17*a* to 17*n* used by the CPU control module 12 for obtaining the states of the virtual servers 102*a* to 102*n*, and for transmitting an instruction to the respective virtual servers 102*a* to 102*n*, an instruction issuing interface 18 used by the CPU control module 12 for issuing an instruction to the physical CPU 104, reference/update interfaces 19*a* to 19*b* used by the physical CPU 104 for referring to or updating the physical CPU control data 13 stored in the memory 105, and an I/O request/response interface 16 for receiving an interrupt request from the I/O device 106, and responding to the request.

FIG. 3 is a block diagram illustrating functions of the host VMM 103 and the guest VMM 109. The host VMM 103 sets, in order to use the virtualization support feature (VT-x feature) of the physical. CPU 104, the host-VMM-held data 11 in a predetermined field of the memory 105.

The host-VMM-held data 11 is constructed by a field for storing flags indicating use or nonuse of the virtualization support feature of the grandchild OSs 111*a* to 111*n*, and the states of the virtual CPUs 108*a* to 108*n*, and a field of the physical CPU control data 13 for holding the shadow VMCSs 130 (#0 to #n−1) storing the statuses and the like of the respective virtual CPUs 108a to 108n.

The flags of the host-VMM-held data 11 indicating the states of the grandchild OSs and the virtual CPUs include, for example, a virtualization feature enable flag 141 for specifying whether or not each of the grandchild OSs 111a to 111n can use the virtualization support feature of the physical CPU 104, a VMXON flag 142 for setting whether or not the virtualization support feature is being used by each of the virtual CPUs 108a to 108n, and an operation mode flag 143 for indicating whether the virtualization support feature is operating in the VMX root mode or the VMX non-root mode for each of the virtual CPUs 108a to 108n.

The virtualization feature enable flag 141 is set for the respective grandchild OSs 111a to 111n. The value "1" indicates that the corresponding grandchild OS can use the virtualization support feature, and "0" indicates that the grandchild OS does not (or cannot) use the virtualization support feature. This virtualization feature enable flag 141 is set to the respective grandchild OSs 111a to 111n from the management console 107, or is set according to a file specified in advance.

The VMXON flag 142 indicates whether or not the operation mode of each of the virtual CPUs 108a to 108n is the VMX mode. The value "1" indicates that the operation mode of the corresponding one of the virtual CPUs 108a to 108n is the VMX mode, and "0" indicates that the operation mode of the corresponding one of the virtual CPUs 108a to 108n is the normal operation mode, in which the virtualization support feature is not used. The VMXON flag 142 is set to "1" by the host VMM 103 when the grandchild OSs 111a to 111n issue the VMXON instruction, and is reset to "0" by the host VMM 103 when the grandchild OSs 111a to 111n issue a VMXOFF instruction.

The operation mode flag 143 is used to trace the operation mode of a program running on the virtual CPUs 108a to 108n. This operation mode flag 143 is set to "1" by the host VMM 103 upon the VM-entry of the grandchild OSs 111a to 111n, and is reset to "0" by the host VMM 103 upon the VM-exit of the grandchild OSs 111a to 111n. In other words, the operation mode flag 143 indicates, when the VMXON flag 142 is "1", the type of the VMX mode for each of the virtual CPUs 108a to 108n. When the operation mode flag 143 is "0", the virtual CPUs 108a to 108n are in the state (VMX root mode of the virtual CPU) of executing the guest VMM 109, and when the operation mode flag 143 is "1", the virtual CPUs are in the state (VMX non-root mode of the virtual CPU) of executing the user program 110a (grandchild OS 111a or application program 112a).

According to this invention, upon the VM-entry of the grandchild OS 111a, which is the new-generation OS, the host VMM 103 reads a guest-state area 221 and a host-state area 222 of the guest VMCS 22, and sets a content of one of the areas according to an operation of the grandchild OS 111a to the guest-state area 131 of the shadow VMCS #0, thereby realizing the virtualization feature of the grandchild OS 111a on the virtual server 102a.

With the VT-x feature, the switching between the host VMM 103 and the guest VMM 109 or the user program 110a is carried out by the transition between the VM-entry and the VM-exit as described above. Therefore, in order to hold the status of the physical CPU 104 or the like before and after the VM-entry and the VM-exit, the shadow VMCSs #0 to #n−1, which are data structures of the physical CPU control data 13, are used.

To the physical CPU control data 13, for each of the virtual CPUs 108a to 108n, the shadow VMCSs #0 to #n−1 are set, and, as described above, the host VMM 103 assigns, to one guest VMM 109, two shadow VMCSs #0 and #1. Then, the host VMM 103, as illustrated in FIG. 5, uses the shadow VMCS #0 in the virtual VMX root mode, and uses the other shadow VMCS #1 in the virtual VMX non-root mode. In other words, in the virtual VMX root mode, the host VMM 103 sets, to the pointer 115, the address of the shadow VMCS #0, and, as illustrated in FIG. 5, when the guest VMM 109 operates, the setting of the shadow VMCS #0 is reflected to the physical CPU 104. On the other hand, in the virtual VMX non-root mode, the host VMM 103 sets, to the pointer 115, the address of the shadow VMCS #1, and, when the grandchild OS 111a (or application 112a) operates, the setting of the shadow VMCS #1 is used.

Each of the shadow VMCSs 130 includes a guest-state area 131, a host-state area 132, a VM-execution control field 133, a VM-exit control field 134, a VM-entry control field 135, and a VM-exit information field 136.

Figure 4:
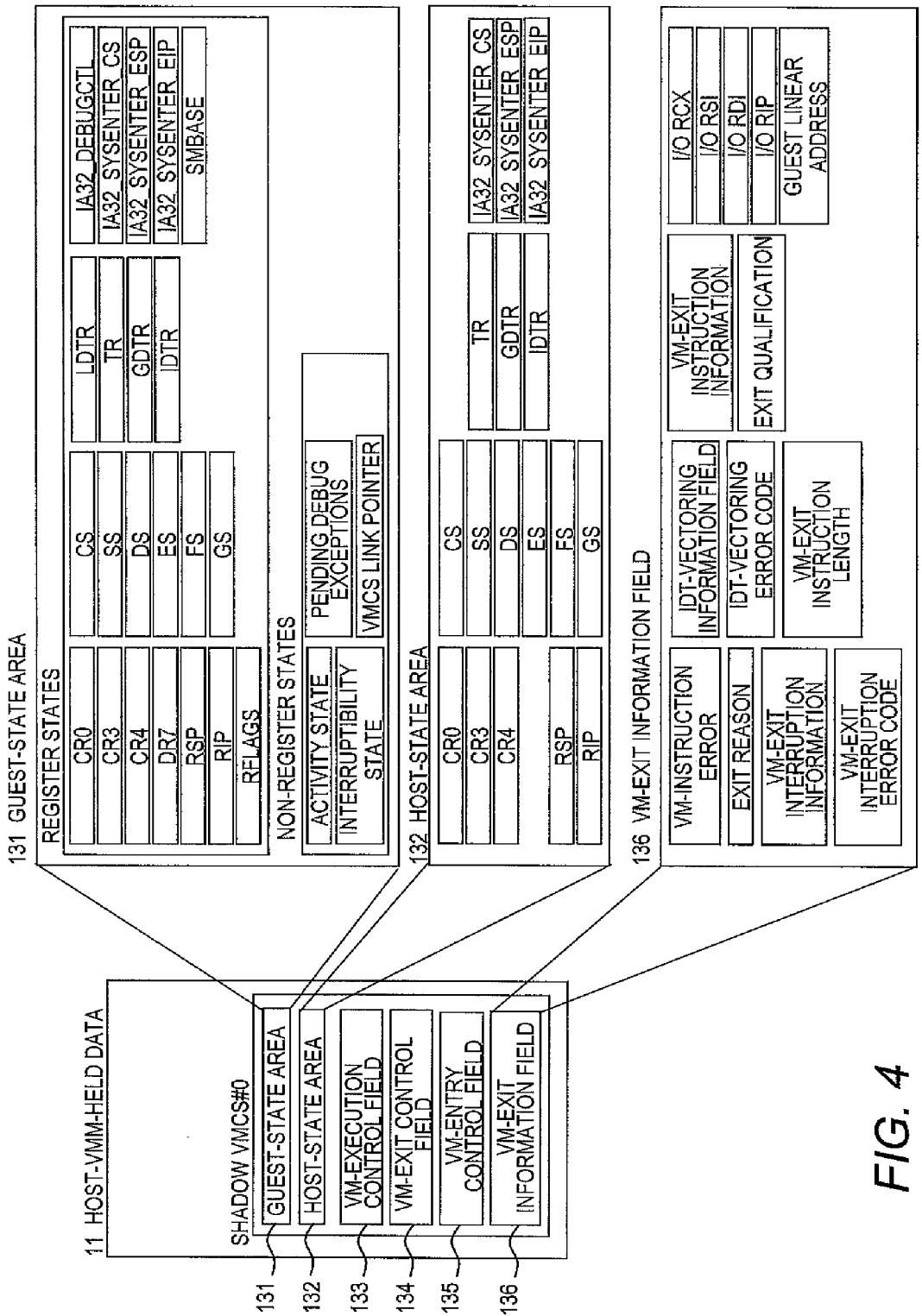
FIG. 4 shows an embodiment of this invention, and is a block diagram illustrating an example of the control data of the shadow VMCS of the host-VMM-held data.

As illustrated in FIG. 4, the guest-state area 131 stores statuses such as register states and non-register states of the virtual CPUs 108a to 108n. In other words, as described later, the status of the guest VMM 109 or the status of the user program 110a is selectively stored. It should be noted that FIG. 4 is a block diagram illustrating an example of the control data of the shadow VMCS of the host-VMM-held data.

As illustrated in FIG. 4, the host-state area 132 stores statuses such as the register state of the physical CPU 104 of the host VMM 103. The VM-execution control field 133 stores setting information of the virtual servers 102a to 102n, such as an exception bitmap and an I/O bitmap. The VM-exit control field 134 stores information such as occurrence reasons (exit reasons) for the VM-exit and IDT-vectoring information. The VM-entry control field 135 stores information used for controlling an operation of the VM-entry. The VM-exit information field 136 stores reasons (instructions or events) for occurrence of the VM-exit. As the reasons for occurrence of the VM-exit, reasons listed under "description" illustrated in FIG. 7, for example, is set to the VM-exit information field 136. It should be noted that FIG. 7 illustrates the details of the reason information (exit reason) 1360 contained in the basic VM-exit information in the VM-exit information field 136 illustrated in FIG. 6.

Figure 6:
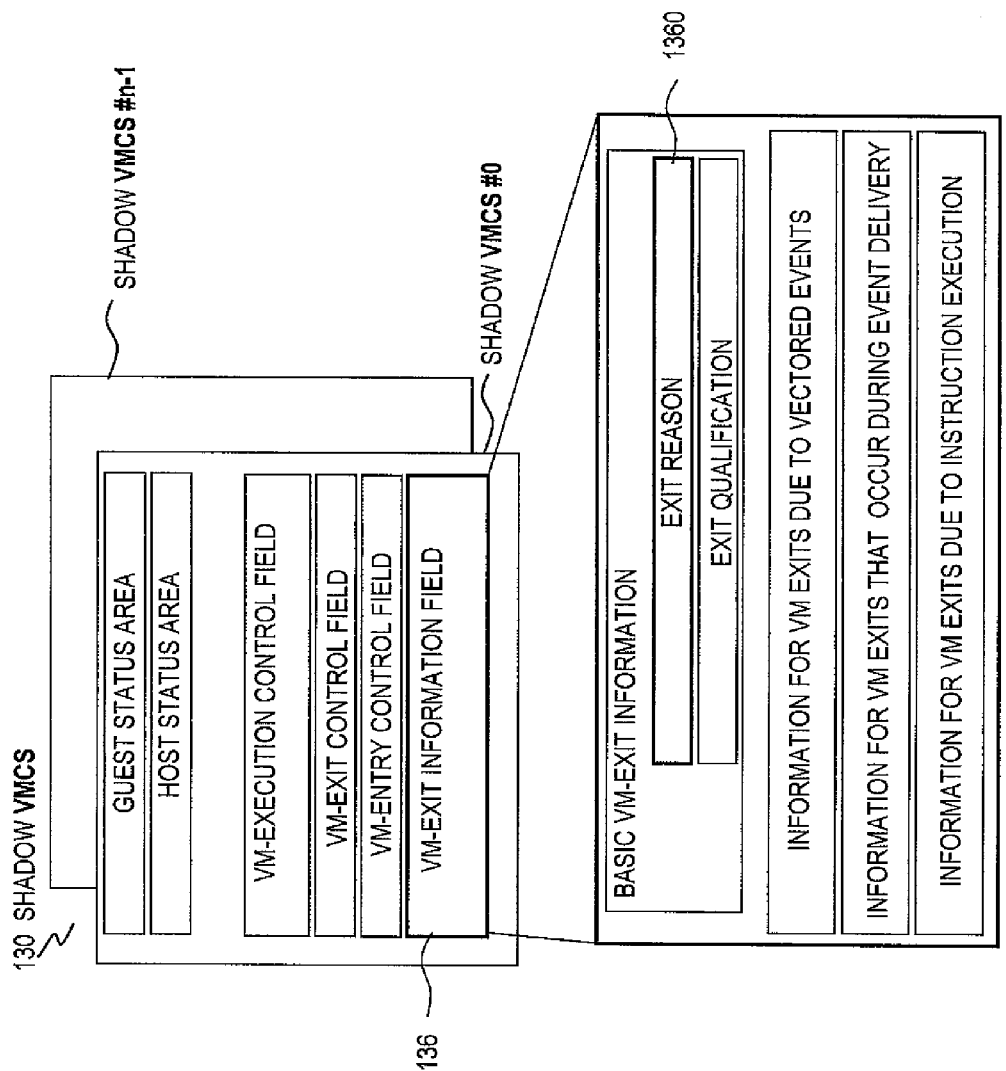
FIG. 6 shows an embodiment of this invention, and is a block diagram illustrating a relationship between the shadow VMCS 130 and the VM-exit information field 136.

Using the shadow VMCSs (#0 to #n−1) as described above, the host VMM 103 controls the respective virtual servers 102a to 102n. It should be noted that FIG. 6 is a block diagram illustrating a relationship between the shadow VMCS 130 and the VM-exit information field 136. Moreover, FIG. 7 is an explanatory diagram illustrating an example of a list of the reasons for the VM-exit.

A description is now given of a configuration of the CPU control module 12 of the host VMM 103. In FIG. 3, the CPU control module 12 includes, in addition to a resource management module (not shown) for assigning the computer resources of the physical server 101 to the respective virtual servers 102a to 102n according to the input from the management console 107 or the like, a state area selection module 121 for selecting, in order to cause the virtualization feature (guest VMM 109) of the grandchild OS 111a to operate, an access destination from which the status of the virtual CPU 108a are read, an emulator 122, a shadow VMCS reference/update module 123, a VM-exit handler 124, a VM-entry instruction issuing module 125, and a user interface. To the resource management module, as described above, a publicly-known or well-known technology may be applied, and hence, a detailed description thereof is omitted in this embodiment.

The VM-exit handler 124 receives the VM-exit from the physical CPU 104, and starts the emulator 122.

The emulator 122 identifies an instruction or an event causing the VM-exit received from the VM-exit handler 124, starts, as described later, a module corresponding to the identified reason for the occurrence, and carries out a process in place of the guest VMM 109 or the user program 110a.

When the emulator 122 detects a change of the operation mode (switch between the VMX root mode and the VMX non-root mode) of the virtual CPU 108a, the emulator 122 starts a module corresponding to the identified reason (VM-entry instruction execution module 1221, VMCLEAR instruction execution module 1223, CPUID instruction execution module 1224, or VM-exit instruction execution module 1222), and starts the state area selection module 121.

On the other hand, the reason for occurrence of the VM-exit received by the emulator 122 from the VM-exit handler 124 is the VMREAD instruction for reading the guest VMCS 22 or the VMWRITE instruction for writing information to the guest VMCS 22, the emulator 122 starts a VMREAD/VMWRITE instruction execution module 1225 for reading/wring the contents of the shadow VMCS #1 in a batch. It should be noted that the VMREAD/VMWRITE instruction execution module 1225, as detailed later, can be called from the VMREAD emulator 231 of the guest VMM 109.

The shadow VMCS reference/update module 123 makes access to the shadow VMCS 130 corresponding to the access destination selected by the state area selection module 121, and notifies the emulator 122 of an access result.

The shadow VMCS reference/update module 123 contains prefetch entry information 1231 and virtual VM-exit trigger information 1232 used by the VMREAD/VMWRITE instruction execution module 1225 of the emulator 122.

The virtual VM-exit trigger information 1232, as described later, stores a reason for occurrence of the VM-exit obtained by the VM-exit instruction execution module 1222 from the shadow VMCS 130.

FIGS. 9A, 9B, 10A, and 10B are a map showing an example of the prefetch entry information 1231. FIGS. 9A and 10A illustrate a first part of the map. FIGS. 9B and 10B illustrate a last part of the map. The prefetch entry information 1231, as illustrated in FIGS. 9A, 9B, 10A, and 10B, is constructed by a bitmap defining, in advance, elements to be read in a batch by the VMREAD/VMWRITE instruction execution module 1225 from the shadow VMCS 130, and is held in the memory 105.

The prefetch entry information 1231 is constructed by area names 12311 corresponding to the guest-state area 221 to the VM-exit information field 226 illustrated in FIG. 3, field names 12312 constructing the area names 12311, and entries 12313 for respective exit reasons of the VM-exit, and "0" or "1" is set to the respective entries. Though, in FIGS. 9A, 9B, 10A, and 10B, a part of the fields of the shadow VMCS 130 are omitted, fields defined by the VT-x may be properly set.

The prefetch entry information 1231 shows that field names 12312 and area names 12311 to which "1" is set in the entry 12313 for each occurrence reason (exit reason) are read out together by the VMREAD/VMWRITE instruction execution module 1225. On the other hand, the prefetch entry information 1231 shows that when "0" is set in an entry 12313, it is not necessary to read a value of a corresponding field name 12312.

For example, in an entry 12313 of an occurrence reason "CPUID" for the VM-exit, "RFLAGS" and "RIP" fields in the guest-state area 131, and, in entries 12313 of "Exit reason" and "VM-exit instruction length" fields in the VM-exit information field 136, "1" is set, which indicates that those fields are read in a batch by the VMREAD/VMWRITE instruction execution module 1225.

Moreover, to the prefetch entry information 1231, the VMREAD/VMWRITE instruction execution module 1225 of the host VMM 103, described later, learns about the read fields, and field names 12312 to be read can be added to the occurrence reasons for the VM-exit.

In this example, though the prefetch entries are defined for each exit reason, in a certain embodiment, more detailed conditions may be set. For example, in addition to the exit reasons, when the IDT-vectoring information is used as a key, for respective exceptions and external interrupt vector numbers, prefetch entries may be set in detail. Though a detailed description thereof is omitted due to limitation in available space, it is a variation which is readily understood by persons skilled in the art, and is included in this invention.

Though the example in which the prefetch entry information 1231 is held in the memory 105, and thus rewritable has been described, the prefetch entry information 1231 may be set as fixed data, and may be integrated into the program of the host VMM 103, or may be implemented as hard code in a ROM (not shown) of the physical server 101.

(Configuration of Guest VMM)

On the other hand, the virtual CPU control data 114 managed by the guest VMM 109 of the virtual server 102a stores the guest VMCS 22 having the same data structure as the shadow VMCS #0 of the above-mentioned physical CPU control data 13.

The guest VMM 109 includes the guest-state area 221 for storing statuses such as register states of the virtual CPU 108a executing the user program 110a (grandchild OS 111a or application program 112a), and the like, the host-state area 222 for storing statuses such as the register states of the virtual CPU 108a executing the guest VMM 109, a VM-execution control field 223 for storing setting information of the virtual server 102a, a VM-exit control field 224 for storing information such as a reason for the VM-exit on the virtual server 102a, a VM-entry control field 225 for storing information used for controlling the operation of the VM-entry on the virtual server 102a, and a VM-exit information field 226 for storing information identifying a reason for the VM-exit on the virtual server 102a.

Similarly to FIG. 4, the guest-state area 221 stores the statuses such as the register states of the virtual CPU 108a. In other words, as described later, the status of the grandchild OS 111a or the status of the application program 112a is selectively stored.

In the shadow VMCS #0 of the host VMM 103 for controlling the states of the virtual server 102a, the guest-state area 131 stores the status of the guest VMM 109 or the status of the user program 110a (grandchild OS 111a or application program 112a), and the host-state area 132 stores the status of the host VMM 103.

On the other hand, in the guest VMCS 22 of the guest VMM 109, the guest-state area 221 stores the status of the grandchild OS 111a or the status of the application program 112a, and the host-state area 222 stores the status of the guest VMM 109, which is different from the shadow VMCS 130.

The guest VMM 109 further includes the VMREAD emulator 231 and the VMWRITE emulator 232 as the instruction code 230 for reading/writing from/to the guest VMCS 22.

Those VMREAD emulator 231 and VMWRITE emulator 232, in place of the guest VMCS 22, carry out the reading and writing in the VMX non-root mode, thereby restraining the VM-exit from occurring.

Moreover, the guest VMM 109 includes the update bitmap 227 used by the guest VMCS 22 to notify the VMREAD emulator 231 or VMWRITE emulator 232 of update states from the shadow VMCS 130.

The update bitmap 227 is updated by the host VMM 103, and, as illustrated in FIG. 11, stores update states of the respective fields constructing the respective areas of the guest VMCS 22.

FIG. 11 is a map showing an example of the update bitmap 227. In the update bitmap 227, one entry is constructed by an area name 2271 corresponding to one of the guest-state area 221 to the VM-exit information field 226 illustrated in FIG. 3, a field name 2272 constructing the area name 2271, an update state 2273 (indicated as "Updated" in FIG. 3) indicating whether or not, to a value corresponding to the field name 2272 or the area name 2271 of this entry in the guest VMCS 22, a value in the shadow VMCS #0 has been updated by the host VMM 103, and a dirty state 2274 (indicated as "Dirty" in FIG. 3) indicating whether the value corresponding to the field name 2272 or the area name 2271 of this entry in the guest VMCS 22 has been updated by the guest VMM 109. Though, in FIG. 11, a part of the fields in the shadow VMCS 130 are omitted, fields defined by the VT-x may be appropriately set.

When the value in the guest VMCS 22 corresponding to the field name 2272 or the area name 2271 has been updated by the host VMM 103, to the update state 2273, "1" is set, and otherwise, "0" is set.

When the value in the guest VMCS 22 corresponding to the field name 2272 or the area name 2271 has been updated by the guest VMM 109, to the dirty state 2274, "1" is set, and otherwise, "0" is set.

The VMREAD emulator 231 of the instruction code 230, which provides the emulator, refers to the update bitmap 227, reads the values updated by the host VMM 103 from the guest VMCS 22, and returns the values to the guest VMM 109.

Moreover, the VMREAD emulator 231 refers to the update bitmap 227, thereby checking the update state of the guest VMCS 22. For elements of the guest VMCS 22 which have not been updated by the host VMM 103, the VMREAD emulator 231 request the host VMM 103 to read the shadow VMCS 130. On this occasion, the VMREAD emulator 231 generates the VM-exit, thereby causing the host VMM 103 to read the shadow VMCS 130, and updates the values of the guest VMCS 22 corresponding to the fields subject to the VMREAD and the update states 2273. As a result, the VMREAD emulator 231 returns, to the guest VMM 109, for all the elements in the guest VMCS 22, the values updated by the values of the shadow VMCS 130.

The VMWRITE emulator 232 of the instruction code 230, which provides the emulator, writes values instructed by the virtual VMWRITE instruction to the guest VMCS 22. Then, the VMWRITE emulator 232 sets 1 to the dirty state 2274 of the entry corresponding to the area name 2271 and the field name 2272 written in the guest VMCS 22, thereby indicating the update carried out by the guest VMM 109 for reference to be made by the host VMM 103.

As a method involving calling the VMREAD emulator 231 or the VMWRITE emulator 232 from the guest VMM 109, by a binary conversion of the VMM codes (for example, replacing the VMREAD instruction and VMWRITE instruction by MOVE instructions, thereby reading the shadow VMCS), or a static conversion of the VMM codes by a quasi-virtualization, the VMREAD instruction and the VMWRITE instruction are converted, thereby restraining the VM-exit from occurring on the physical CPU 104.

(Overview of Operation of Host VMM>

As illustrated in FIGS. 6 and 7, on this occasion, a reason for occurrence of the VM-exit is one set to "EXIT REASON" of the VM-exit information field 136 of the shadow VMCS #0. To the list of the reasons of the VM-exit illustrated in FIG. 7, reasons 1361 caused by the issuance of the VM-entry instruction, reasons 1362 caused by the issuance of the VMCLEAR instruction (fourth control instruction), and notice conditions 1363 to which an absence/presence of a VM-exit notice to the guest VMM 109 is set are set in advance. Though, in FIG. 7, the VMREAD instruction, the VMWRITE instruction, and the like are omitted, reasons for generation of the VM-exit defined by the VT-x may be appropriately set.

For example, if the VM-entry instruction (VMLAUNCH instruction or VMRESUME instruction) is detected as a reason for the VM-exit of when the operation mode of the virtual CPU 108a is switched, the VM-entry instruction corresponds to the reason 1361 of FIG. 7, and thus, the host VMM 103 carries out the emulation on the VM-entry instruction execution module, thereby carrying out a process in place of the guest VMM 109 or the user program 110a.

If a reason for the VM-exit is a condition for a notice to the guest VMM 20 corresponding to a notice condition 1363 of FIG. 7, the host VMM 103 starts the VM-exit instruction execution module 1222 and carries out the emulation similarly.

The state area selection module 121 reads the operation mode flag 143 of the virtual CPU (CPU 108a in this example) which has generated the VM-exit from the host-VMM-held data 11, and determines whether the VMX mode is the VMX root mode or the VMX non-root mode. If the operation mode flag 143 is "0", which indicates the VMX root mode, the guest VMM 109 is operating, and thus, the state area selection module 121 reads the host-state area 222 from the guest VMCS 22 of the virtual server (virtual server 102a in this example) which has generated the VM-exit.

On the other hand, if the operation mode flag 143 is "1", which indicates the VMX non-root mode, the user program 110a is operating, and thus, the state area selection module 121 reads the guest-state area 221 from the guest VMCS 22 of the corresponding virtual server 102a.

When the CPU control module 12 has completed the read from the guest VMCS 22, the CPU control module 12 starts the shadow VMCS reference/update module 123. The shadow VMCS reference/update module 123 writes the information in the guest VMCS 22 read by the state area selection module 121 to the guest-state area 131 of the shadow VMCS #0 corresponding to the virtual CPU 108a, which is subject to the process of the VM-exit, thereby updating the shadow VMCS.

When the guest-state area 131 of the shadow VMCS #0 has been updated, the CPU control module 12, in order to switch the operation mode of the virtual CPU 108a from the VMX root mode to the VMX non-root mode, updates the operation mode flag 143 to "1", and sets the address of the shadow VMCS #0 of the subject virtual CPU 108a to the pointer 115 of the physical CPU 104.

Then, the CPU control module 12 starts the VM-entry instruction issuing module 125, thereby issuing the VM-entry instruction (VMRESUME instruction) to the physical CPU 104.

When the physical CPU 104 receives the VM-entry instruction, the physical CPU 104 reads the guest-state area 131 of the shadow VMCS #0 pointed by the pointer 115, and executes the guest VMM 109 or the user program 110a of the virtual server 102a selected by the state area selection module 121.

On the other hand, when the VMREAD emulator 231 of the guest VMM 109 refers to the guest VMCS 22, and when data specified by the virtual VMREAD instruction are not updated by the values of the shadow VMCS 130 (the update states 2273 of the update bitmap 227 are "0"), the guest VMM 109 generates, in the VMX root mode, VM-exit that the VMREAD instruction causes.

On this occasion, the VMREAD/VMWRITE instruction execution module 1225 of the host VMM 103 carries out the emulator processing, thereby reading data from the shadow VMCS #1 to reflect the data to the guest VMCS 22. Then, the data reflected to the guest VMCS 22 have not been prefetched, and thus, "1" is set to corresponding fields in the prefetch entry information 1231, thereby preventing the VM-exit from occurring on subsequent virtual VMREAD instructions.

Moreover, when the VM-exit is generated from the user program 110a in the VMX non-root mode, and the VM-exit notice condition 1363 to the guest VMM 109 is set, the VM-exit instruction execution module 1223 of the host VMM 103 carries out the prefetch. As a result, the guest VMCS 22 of the guest VMM 109 is updated with the latest values of the shadow VMCS 130.

Figure 16:
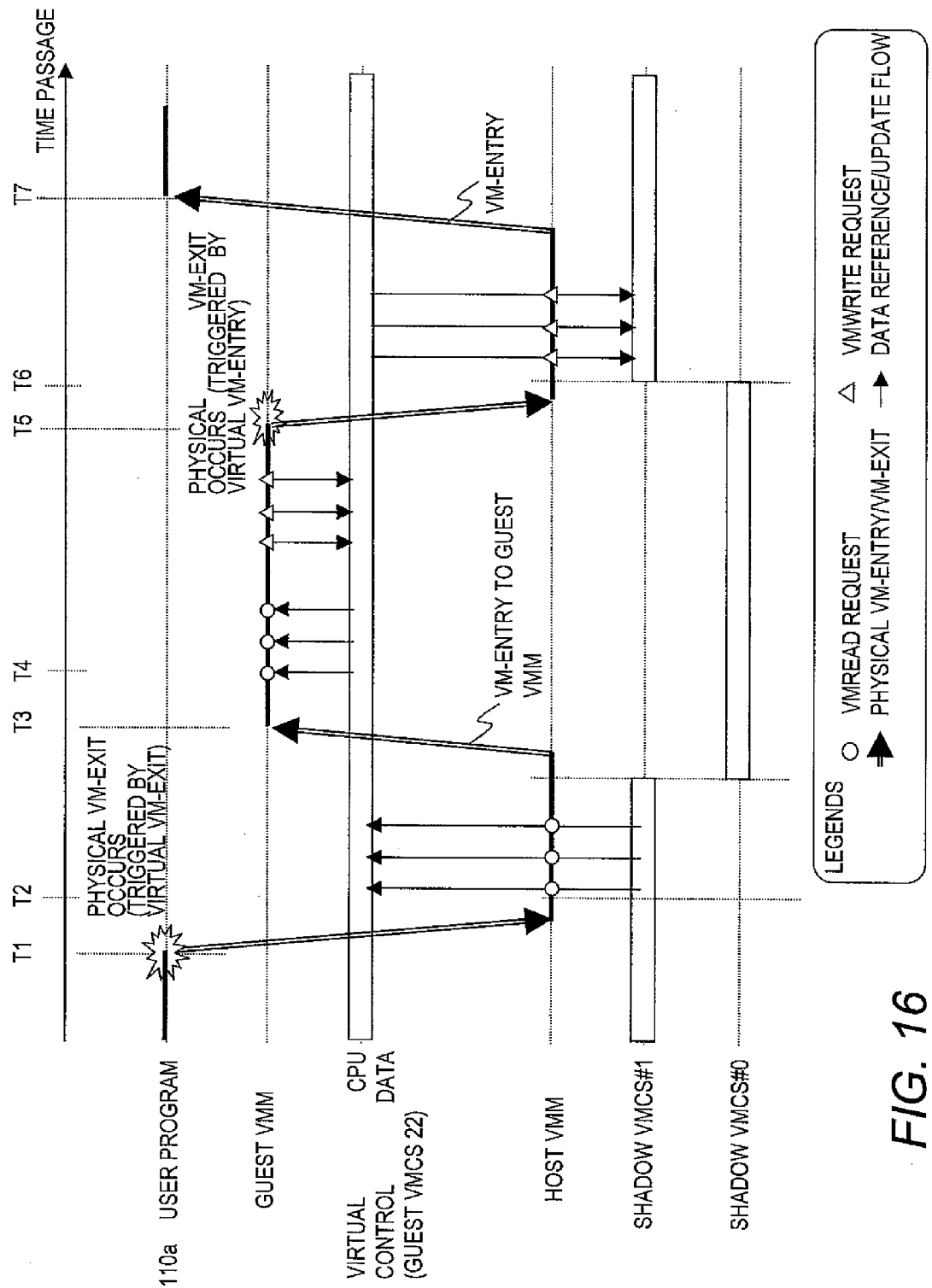
FIG. 16 shows an embodiment of this invention, and is a time chart illustrating an example of accesses to the shadow VMCSs #0 and #1, and the guest VMCS 22 by the host VMM 103 and the guest VMM 109.

A process for restraining the VM-exit caused by the virtual VMREAD instruction or virtual VMWRITE instruction as described above from occurring is described in FIG. 16. FIG. 16 is a time chart illustrating an example of accesses to the shadow VMCSs #0 and #1, and the guest VMCS 22 by the host VMM 103 and the guest VMM 109.

A case in which, at a time T1, during instruction execution of the user program 110a, the physical VM-exit corresponding to the virtual VM-exit for switching the operation mode of the virtual CPU 108a occurs is illustrated. Examples of the virtual VM-exit include issuance of the VMCALL instruction which is an explicit call of the guest VMM 109 by the user program 110a.

This VM-exit in the VMX non-root mode switches the control to the host VMM 103. For the occurrence reason for the VM-exit, the notice condition of the VM-exit to the guest VMM 109 is set, and thus, the host VMM 103 starts the VM-exit instruction execution module 1222 illustrated in FIG. 3.

The VM-exit instruction execution module 1222, as described later with reference to FIG. 12, carries out the block read of the shadow VMCS #1. In other words, the VM-exit instruction execution module 1222 refers to the prefetch entry information 1231 according to the occurrence reason for the VM-exit, and then reads fields to the entry 12313 having the value of "1" from the shadow VMCS #1 in a batch. The VM-exit instruction execution module 1222 of the host VMM 103 writes values of the fields read in a batch to the guest VMCS 22, and then sets "1" to the update state 2273 of the update bitmap 227.

Then, at a time T3, the host VMM 103 issues the VM-entry to the physical CPU 104, thereby returning the control to the guest VMM 109.

Between times T4 and T5, an example in which the VMREAD emulator 231 or VMWRITE emulator 232 of the guest VMM 109 operates is illustrated, and, by the virtual VMREAD instruction or virtual VMWRITE instruction, writing to or reading from the guest VMCS 22 is carried out. In other words, in the case of the virtual VMREAD instruction, due to the prefetch between the times T2 and T3, the VMREAD emulator 231 substituting the virtual VMREAD instruction can read the guest VMCS 22 without generating the VM-exit.

Moreover, the VMWRITE emulator 232 substituting the virtual VMWRITE instruction writes information to the guest VMCS 22 without generating the VM-exit. On this occasion, the VMWRITE emulator 232 sets, for the updated fields, "1" to the dirty states 2274 of the update bitmap 227.

Then, at the time T5, during the operation of the guest VMM 109, the VM-entry instruction is issued, resulting in the VM-exit. In this case, the mode is the VMX root mode, and thus, the host VMM 103 starts the VM-entry instruction execution module 1221.

The VM-entry instruction execution module 1221 reads, at a time T6, the guest-state area 221 of the guest VMCS 22. Then, the VM-entry instruction execution module 1221 sets the shadow VMCS #1 corresponding to the subject virtual CPU into active, and updates the guest-state area 131 of the subject shadow VMCS #1 with the read information of the guest-state area 221. On this occasion, the VM-entry instruction execution module 1221, by updating only fields having the dirty states 2274 of "1" in the update bitmap 227, can quickly update the guest-state area 131 of the shadow VMCS #1.

Then, at a time T7, the VM-entry instruction execution module 1221 issues the VM-entry instruction, thereby switching the control from the host VMM 103 to the user program 110a.

As described above, by reading the data of the shadow VMCS #1 in a batch according to the prefetch entry information 1231 at the time T2, to thereby update the guest VMCS 22, the VMREAD emulator 231 of the guest VMM 109 can read the guest VMCS 22 without generating the VM-exit.

Moreover, the VMWRITE emulator 232 of the guest VMM 109 can carry out writing to the guest VMCS 22 without generating the VM-exit. Then, upon the next switch of the control to the user program 110a, the data written to the guest VMCS 22 can be reflected to the shadow VMCS #1.

(Details of Process by Host VMM)

Figure 8:
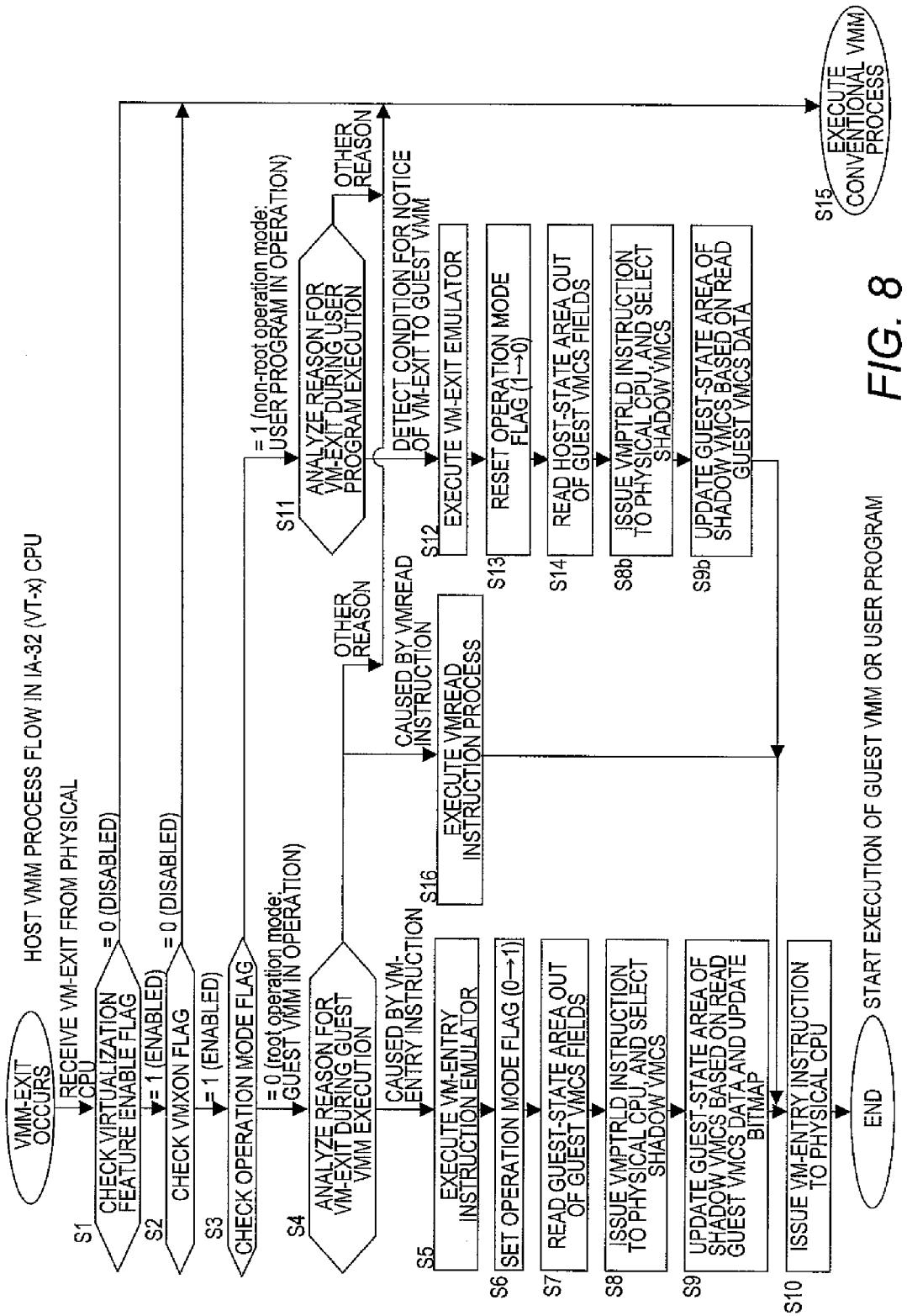
FIG. 8 shows an embodiment of this invention, and is a flowchart illustrating an example of a process carried out by the CPU control module 12 of the host VMM 103 when the CPU control module 12 receives the VM-exit from the physical CPU 104.

A description is now given of a process carried out by the CPU control module 12 of the host VMM 103 with reference to FIG. 8. FIG. 8 is a flowchart illustrating an example of a process carried out by the CPU control module 12 of the host VMM 103 when the CPU control module 12 receives the VM-exit from the physical CPU 104 while the virtual servers 102a to 102n are operating.

First, in Step S1, the CPU control module 12 of the host VMM 103 refers to the virtualization feature enable flag 141 of the host-VMM-held data 11, thereby determining whether one of the grandchild OS 111a to 111n which has generated the VM-exit (referred to as grandchild OS hereinafter) can use the VT-x feature. If the subject grandchild OS can use the VT-x feature, the CPU control module 12 proceeds to Step S2. On the other hand, if the subject grandchild OS does not (or cannot) use the VT-x feature (if the subject grandchild OS is the NT Server or the 2000 Server), the CPU control module 12 proceeds to Step S15, and the host VMM 103 carries out a virtual machine process as described in Japanese Patent Translation Publication No. 2005-529401, or "Intel 64 and IA-32 Architectures Software Developer's Manual VOL 2B".

In Step S2, the host VMM 103 refers to the VMXON flag 142, thereby determining whether or not the virtual CPUs 108a to 108n (referred to as virtual CPU hereinafter) which have caused the VM-exit are in the VMX mode. If the VMXON flag 142 is "1", the virtual CPU is in the VMX mode, and then, the CPU control module 12 proceeds to Step S3. On the other hand, if the VMXON flag 142 is "0", the virtual CPU is in the normal operation mode, and then, the CPU control module 12 proceeds to Step S15 similarly to the above. Then, the host VMM 103 carries out the conventional virtual machine process.

In Step S3, the CPU control module 12 of the host VMM 103 refers to the operation mode flag 143 of the subject virtual CPU, thereby determining whether the operation mode of the virtual CPU is the VMX root mode or the VMX non-root mode. If the operation mode flag 143 is "0", the CPU control module 12 determines that the virtual CPU is in the VMX root mode, and proceeds to Step S4. On the other hand, if the operation mode flag 143 is "1", the CPU control module 12 determines that the virtual CPU is in the VMX non-root mode, and proceeds to Step S11.

In Step S4, the CPU control module 12 identifies a reason for occurrence of the VM-exit received from the physical CPU 104. In Step S4, because the operation mode of the virtual CPU is the VMX root mode, the CPU control module 12 identifies a shadow VMCS 130 (shadow VMCS #0 in this example) storing the status of the guest VMM 109, and refers to the guest-state area 131 of the shadow VMCS #0, thereby identifying the reason for occurrence of the VM-exit. The CPU control module 12, upon detecting the VM-entry instruction (virtual VM-entry instruction=first event) as a reason for occurrence of the VM-exit, proceeds to a process of Step S5, and, upon detecting the VMREAD instruction as the reason for occurrence of the VM-exit, proceeds to a process of Step S16. Otherwise, the CPU control module 12 proceeds to a process of Step S11.

In Step S5 in the case where the VM-entry instruction has caused the VM-exit, the CPU control module 12 executes the VM-entry instruction execution module 1221 from the emulator 122, thereby emulating a predetermined process (such as the startup of the state area selection module 121) required for switching the subject virtual CPU to the VMX non-root mode in place of the guest VMM 109.

Then, in Step S6, the CPU control module 12 of the host VMM 103 switches the operation mode of the virtual CPU from the VMX root mode to the VMX non-root mode, and hence the CPU control module 12 updates the operation mode flag 143 of the subject virtual CPU to "1".

In Step S7, the CPU control module 12 reads the statuses of the grandchild OS or the application program stored in the guest-state area 221 from the guest VMCS 22 of the virtual CPU control data 114 of the subject guest VMM 109.

Then, in Step S8, the CPU control module 12 issues the VMPTRLD instruction to the physical CPU 104, thereby setting the shadow VMCS #0 corresponding to the subject virtual CPU to be active, and sets the address of the activated shadow VMCS #0 to the pointer 115. As a result of this VMPTRLD instruction (second control instruction), the host VMM 103 selects the shadow VMCS of the subject virtual CPU (virtual server) from the plurality of shadow VMCSs #0 to #n−1.

In Step S9, the CPU control module 12 updates the guest-state area 131 of the subject shadow VMCS #0 based on the information of the guest-state area 221 read in Step S7 and the update bitmap 227 described later. Of the update process for this shadow VMCS #0, a detailed description is later given referring to a subroutine illustrated in FIG. 14.

Then, in Step S10, the CPU control module 12 issues the VM-entry instruction to the physical CPU 104.

When the physical CPU 104 receives the VM-entry instruction, the physical CPU 104 executes the guest VMM 109 or the user program 110a (referred to as user program hereinafter) of the subject virtual server based on the content of the guest-state area 131 of the shadow VMCS #0 specified by the pointer 115.

On the other hand, if the operation mode flag 143 is "1" in Step S3, because the subject virtual CPU is in the VMX non-root mode, which indicates that the subject virtual CPU is executing the user program, the CPU control module 12 executes a process of Step S11.

In Step S11, the CPU control module 12 refers to the list of reasons for generation of the VM-exit illustrated in FIG. 7, thereby searching the VM-exit notice condition 1363 directed to the guest VMM 109. When, for the reason for occurrence of the VM-exit during the execution of the user program, the VM-exit notice condition 1363 is set, the CPU control module 12 proceeds to Step S12 of notifying the guest VMM 109 of the VM-exit. On the other hand, when, for the reason for occurrence of the VM-exit during the execution of the user program, the VM-exit notice condition 1363 is not set, the CPU control module 12 proceeds to Step S15, and carries out a virtual machine process as in a conventional case.

In Step S12 of notifying the guest VMM 109 of the VM-exit, the CPU control module 12 executes the VM-exit instruction execution module 1222 of FIG. 3, thereby emulating a predetermined process (such as the startup of the state area selection module 121) required for switching the subject virtual CPU to the VMX root mode.

Figure 12:
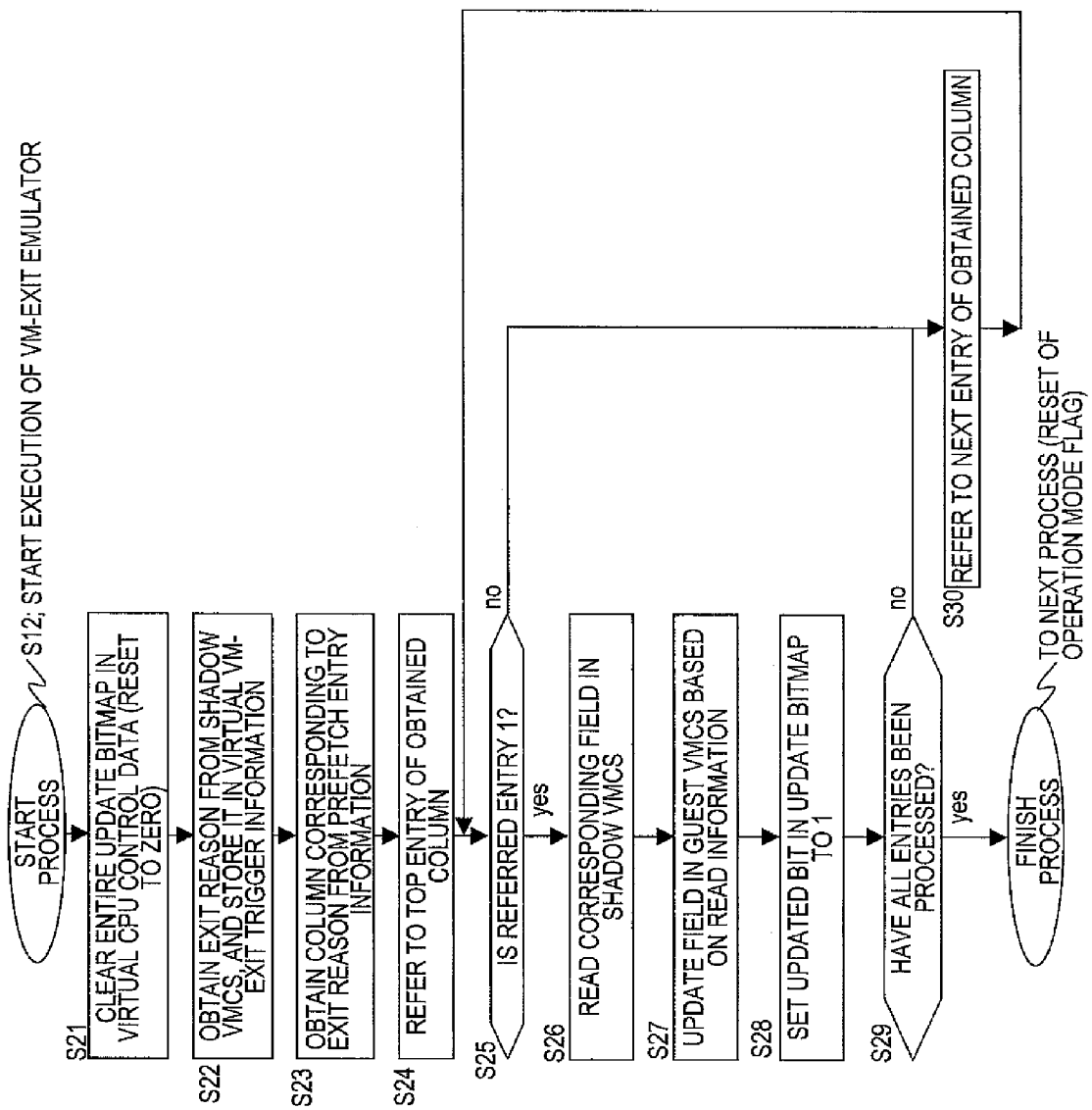
In FIG. 12 shows an embodiment of this invention, and is a flowchart illustrating the subroutine of the emulation process of the VM-exit instruction execution module 1222 carried out by the host VMM 103 in Step S12.

FIG. 12 is a flowchart illustrating the subroutine of the emulation process of the VM-exit instruction execution module 1222 carried out by the host VMM 103 in Step S12. This flowchart illustrates the process carried out by the VM-exit instruction execution module 1222 illustrated in FIG. 3 in the VMX non-root mode.

In Step S21, the VM-exit instruction execution module 1222 of the host VMM 103 clears, to zero, all entries of the update state 2273 and the dirty state 2274 of the update bitmap 227 of the virtual CPU control data 114.

In Step S22, the host VMM 103 obtains the occurrence reason 1360 from the shadow VMCS #1 corresponding to the user program having caused the VM-exit. In the VMX non-root mode, the process of Step S12 of FIG. 8 is carried out, and thus, the host VMM 103 reads the shadow VMCS #1 used in the VMX non-root mode.

Then, the host VMM 103 stores the obtained occurrence reason 1360 in the virtual VM-exit trigger information 1232 of the shadow VMCS reference/update module 123 of the CPU control module 12.

Then, in Step S23, the host VMM 103 refers to the prefetch entry information 1231 of the shadow VMCS reference/update module 123, thereby obtaining a column corresponding to the obtained occurrence reason 1360 (subject entries 12313).

In Step S24, the host VMM 103 refers to the top entry of the column (such as the entry 12313 corresponding to CS of the guest-state area in FIGS. 9A and 9B, for example) of the prefetch entry information 1231 obtained in Step S23.

Then, in Step S25, the host VMM 103 determines whether the value of the referred entry is "1" or not. If the value of the entry is "1", the host VMM 103 proceeds to Step S26.

In Step S26, the host VMM 103 obtains the value in the field of the shadow VMCS #1 specified by the area name 12311 and the field name 12312 of the prefetch entry information 1231. In other words, because the process illustrated in FIG. 12 is carried out in Steps S3, S11, and S12 of FIG. 8, the process is carried out for the VM-exit in the VMX non-root mode. Thus, the shadow VMCS #1 is referred to as illustrated in FIG. 5. On the other hand, if the value of the entry is "0", the host VMM 103 proceeds to Step S30, refers to the next entry, and repeats the above-mentioned process of Step S25.

In Step S27, the host VMM 103 writes the value of the field obtained in Step S26 in a field of the guest VMCS 22 specified by the area name 12311 and the field name 12312 of the prefetch entry information 1231, thereby updating the field.

Then, in Step S28, the host VMM 103 sets "1" to the update state 2273 of the update bitmap 227 corresponding to the prefetch entry information 1231 presently being referred to, thereby indicating that the corresponding field in the guest VMCS 22 has been updated.

Then, in Step S28, the host VMM 103 determines whether, for all the entries whose values are set to "1" out of the entries 12313 in the column of the prefetch entry information 1231 obtained in Step S23, values of the guest VMCS 22 are updated by the values in the shadow VMCS #1. When all the entries of the obtained column have been processed, the subroutine of FIG. 12 is finished, and the host VMM 103 returns to the process of FIG. 8. On the other hand, when all the entries of the obtained column have not been processed, the host VMM 103 proceeds to Step S30, refers to the next entry, and repeats the process from Step S25 to Step S29.

As a result of the process illustrated in FIG. 12, in the case where the VM-exit occurs in the VMX non-root mode, and where, in the occurrence reason 1360, the VM-exit notice condition 1361 to the guest VMM is set, the VM-exit instruction execution module 1222 of FIG. 12 can select a column (entries 12313) in the prefetch entry information 1231 corresponding to the occurrence reason for the VM-exit, and for all the fields having the value of the entry of "1" in the column, read values in a batch from the shadow VMCS #1, thereby updating the guest VMCS 22.

In other words, by defining, based on the occurrence reason for the VM-exit, which fields of the shadow VMCS #0 are to be read in the prefetch entry information 1231, the values of the plurality of fields in the shadow VMCS #1 can be read in a batch in the VMX non-root mode when the VM-exit occurs once, and the guest VMCS 22 can be updated by the values of the shadow VMCS #1. As a result, the guest VMM 109 writes, to the guest VMCS 22, values of the fields of the shadow VMCS #1 which are highly possibly referred to by the virtual VMREAD instruction, and it is thus possible to restrain the VM-exit from frequently occurring upon the reference to the guest VMCS 22.

After the completion of the subroutine of FIG. 12, the CPU control module 12 proceeds to Step S13 of FIG. 8.

Then, in Step S13, the CPU control module 12 switches the operation mode of the subject virtual CPU from the VMX non-root mode to the VMX root mode, and hence the CPU control module 12 resets the operation mode flag 143 of the subject virtual CPU from "1" to "0". Then, in Step S14, the CPU control module 12 reads the statuses of the guest VMM 109 stored in the host-state area 221 from the virtual CPU control data 114 of the subject guest VMM 109.

When the process of Step S14 has been completed, processes of Steps S8b, S9b, and S10 are sequentially carried out. In Step S8b, the CPU control module 12 issues the VMPTRLD instruction, thereby switching the shadow VMCS #1 to the shadow VMCS #0. In Step S9b, the CPU control module 12 updates the guest-state area 131 of the subject shadow VMCS 130 by the information of the host-state area 222 read in Step S14, thereby setting the status of the guest VMM 109. When it is determined that the guest VMM 109 does not change the host-state area, there may be provided an implementation which skips this process.

In Step S10, the CPU control module 12 issues the VM-entry instruction to the physical CPU 104.

As a result, when the physical CPU 104 receives the VM-entry instruction, the physical CPU 104 executes the guest VMM 109 of the subject virtual server based on the content of the guest-state area 131 of the shadow VMCS 130 specified by the pointer 115.

Through the above-mentioned process, if the grandchild OS 111a is the new-generation OS incorporating the virtualization feature, the host VMM 103 selects the statuses to be written to the guest-state area 131 of the shadow VMCS 130 from one of the guest VMM and the user program according to the operation mode of the virtual CPU 108a and the reason for the generated VM-exit. Then, when the host VMM 103 issues the VM-entry instruction to the physical CPU 104 (first virtual CPU), it becomes possible to switch the execution on the virtual server between the guest VMM and the user program operating on the second virtual CPU provided by the guest VMM, and thus, the guest VMM can provide a plurality of virtualization environments (user programs) on the virtual server.

A description is now given of a process for restraining the VM-exit from frequently occurring due to the virtual VMREAD instruction or virtual VMWRITE instruction by the guest VMM 109.

In Step S4 of FIG. 8, when the mode is the VMX root mode, and the occurrence reason for the VM-exit is the VMREAD instruction, the CPU control module 12 proceeds to Step S16, and carries out the emulator process carried out by the VMREAD/VMWRITE instruction execution module 1225. A detailed description is later given of the emulator process by the VMREAD/VMWRITE instruction execution module 1225 referring to a subroutine illustrated in FIG. 15.

In Step S16, when the shadow VMCS #1 has been read, the CPU control module 12 proceeds to Step S10, sets the status of the guest VMM 109, and issues the VM-entry instruction to the physical CPU 104. After the VM-entry instruction has been issued, the physical CPU 104 resumes the VMREAD emulator starting from Step S45 illustrated in FIG. 13.

Figure 14:
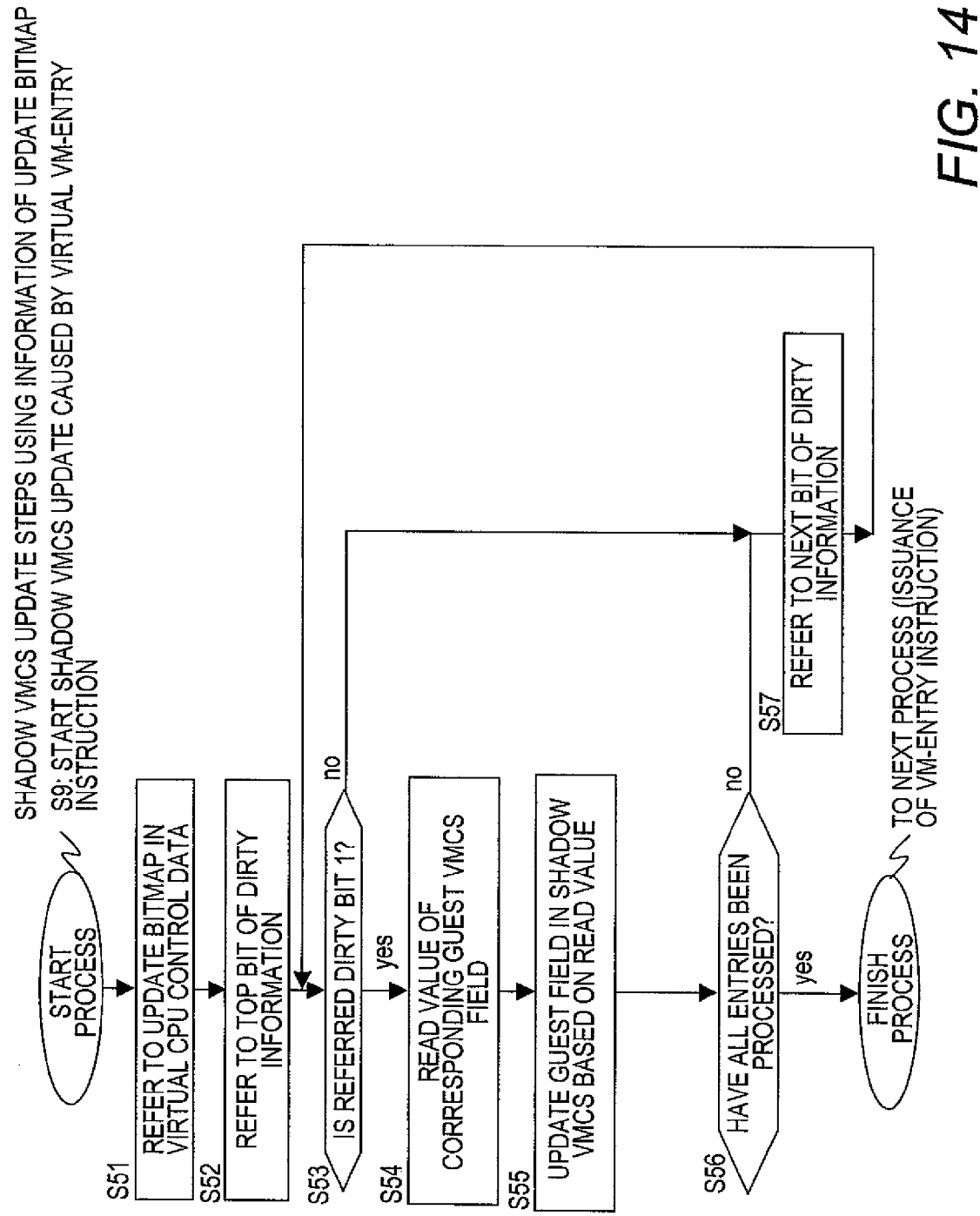
FIG. 14 shows an embodiment of this invention, and is a flowchart of the subroutine illustrating an example of the update process for the shadow VMCS carried out in Step S9 of FIG. 8.

FIG. 14 is a flowchart of the subroutine illustrating an example of the update process for the shadow VMCS carried out in Step S9 of FIG. 8. This process is carried out following Step S5 of FIG. 8, and because the mode is switched to the VMX non-root mode in Step S6, the host VMM refers to the shadow VMCS #1.

A process of writing the data written to the guest VMCS 22 by the virtual VMWRITE instruction to the guest-state area 131 of the shadow VMCS 130 for the update is carried out. This process is carried out by the VMREAD/VMWRITE instruction execution module 1225 of the CPU control module 12.

In Step S51, the host VMM 103 refers to the update bitmap 227 of the guest VMM 109. In Step S52, the host VMM 103 refers to the dirty state 2274 of the top entry (such as CS in FIG. 11) of the update bitmap 227. In Step S53, the host VMM 103 determines whether the referred dirty state 2274 is "1". When the referred dirty state 2274 is "0", the corresponding field in the guest VMCS 22 has not been updated, the host VMM 103 thus refers to the next entry, and repeats the process of Step S53.

On the other hand, when the referred dirty state 2274 is "1", the corresponding field in the guest VMCS 22 has been updated, the host VMM 103 proceeds to Step S54, and reads the value of the field corresponding to the dirty state 2274 from the guest VMCS 22.

Then, in Step S55, the host VMM 103 writes the value of the field read in Step S54 to the corresponding field of the shadow VMCS 130 for update.

In Step S56, when all the entries in the update bitmap 227 have been processed, the host VMM 103 finishes the subroutine, and returns to FIG. 8. On the other hand, when all the entries in the update bitmap 227 have not been processed, the host VMM 103 proceeds to Step S57, and repeats the process from Step S53 to Step S56.

As a result of the above-mentioned process, the values of the fields of the guest VMCS 22 having the dirty states 2274 of "1" in the update bitmap 227 are reflected to the shadow VMCS 130.

Figure 15:
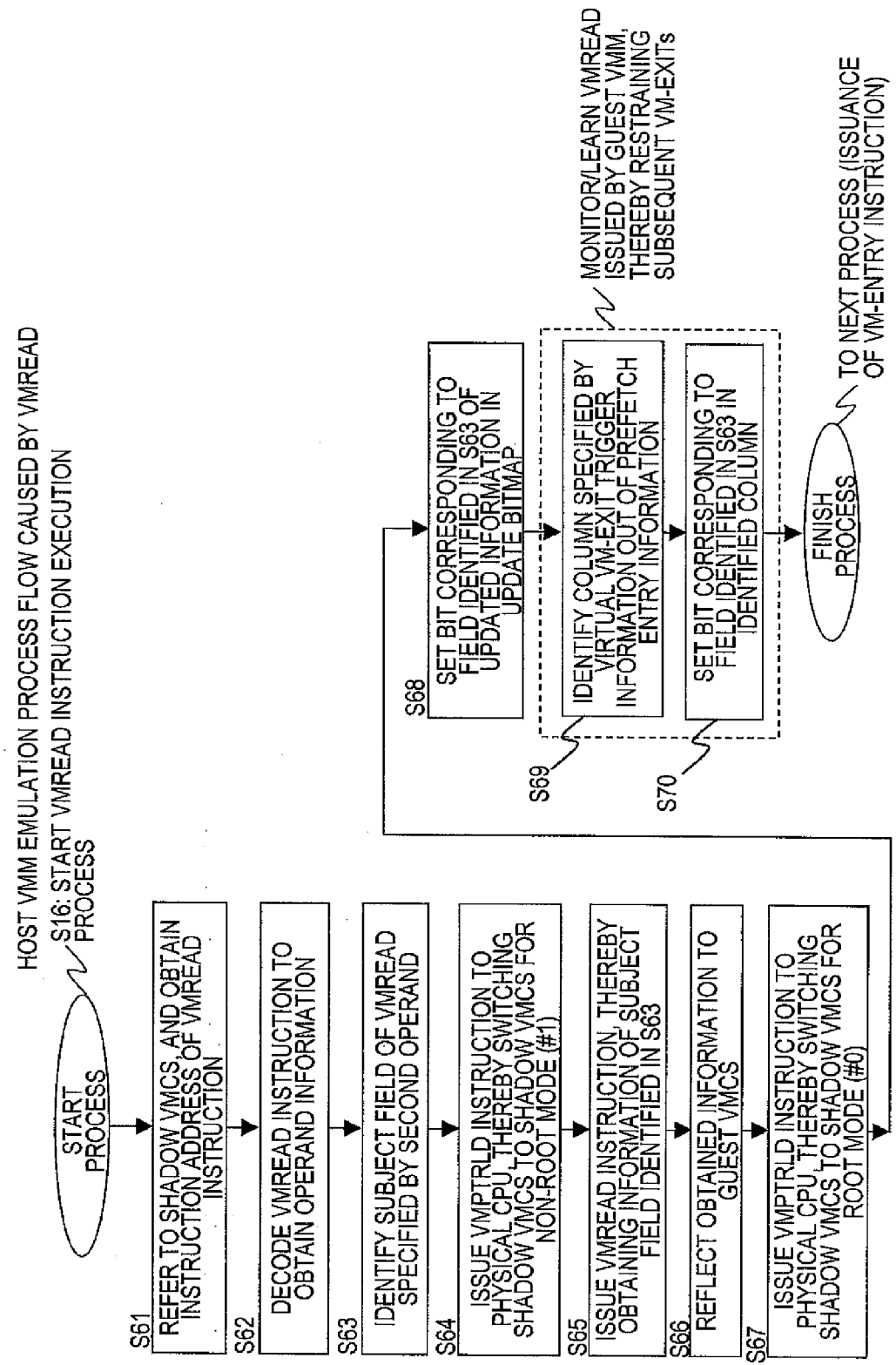
FIG. 15 shows an embodiment of this invention, and is a flowchart illustrating an example of the VMREAD instruction process carried out in Step S16 of FIG. 8.

FIG. 15 is a flowchart illustrating an example of the VMREAD instruction process carried out in Step S16 of FIG. 8. This flowchart illustrates the process carried out by the VMREAD/VMWRITE instruction execution module 1225 of FIG. 3. This process is carried out when the VM-exit is generated by the VMREAD emulator 231 of the guest VMM 109, which is described later, and the occurrence reason for the VM-exit generated in the VMX root mode is the VMREAD instruction.

In Step S61, the VMREAD/VMWRITE instruction execution module 1225 of the host VMM 103 refers to the VM-exit information field 136 of the shadow VMCS #0, thereby obtaining an instruction address of the VMREAD instruction issued by the VMREAD emulator 231 of the guest VMM 109.

In Step S62, the host VMM 103 decodes the VMREAD instruction at the instruction address obtained by the host VMM 103 in Step S61, thereby obtaining operand information. On this occasion, as the operand information, for example, first operand information represents a register number to which a result of the VMREAD instruction is to be returned, and second operand information represents field information of the shadow VMCS #0 to be referred to by the VMREAD instruction.

In Step S63, the host VMM 103 identifies, based on the second operand information obtained in Step S62, the field of the shadow VMCS #0 to be read by the VMREAD instruction.

In Step S64, the host VMM 103 issues the VMPTRLD instruction to the physical CPU 104, thereby switching the shadow VMCS 130 to the shadow VMCS #1 for the VMX non-root mode which is provided for the user program. In other words, in order that the VMREAD emulator 231 of the guest VMM 109 obtain status indicating how the user program 110a has been operating, the host VMM 103 switches the shadow VMCS 130, which is subject to reading, to the shadow VMCS #1 for the VMX non-root mode.

In Step S65, the host VMM 103 issues the VMREAD instruction, thereby reading the information in the field identified in Step S63 from the switched shadow VMCS #1.

Then, in Step S66, the host VMM 103 writes the value of the field of the shadow VMCS #1 obtained in Step S65 to the guest VMCS 22, thereby updating the information in the field.

In Step S67, the host VMM 103 issues the VMPTRLD instruction to the physical CPU 104 to switch the shadow VMCS 130 to the shadow VMCS #0 used in the VMX root mode, which is used by the guest VMM 109, thereby switching back to the shadow VMCS 130 which is intended to be operated by the host VMM 103.

In Step S68, the host VMM 103 sets the update state 2273 of the update bitmap 227 corresponding to the field identified in Step S63 to "1", thereby recording the fact that the value of the shadow VMCS #1 has been reflected to the guest VMCS 22.

In Steps S69 and S70, the occurrence reason for the VM-exit from the VMREAD emulator 231 of the guest VMM 109 is estimated that the field identified in Step S63 is not set to "1" in the prefetch entry information 1231. Therefore, in order to prevent the VM-exit from occurring for the next VMREAD instruction, learning is carried out.

First, in Step S69, the occurrence reason for the virtual VM-exit, which is the virtual VMREAD instruction, is identified as the virtual VM-exit trigger information. Then, the host VMM 103 identifies, out of the prefetch entry information 1231, a column of entries 12313 corresponding to the virtual VM-exit trigger information.

Then, in Step S70, in the identified column, the host VMM 103 sets the entry 12313 corresponding to the field identified in Step S63 to "1", and finishes the process.

As a result of the above-mentioned process, first, the VMREAD/VMWRITE instruction execution module 1225 executes the VMREAD instruction issued by the VMREAD emulator 231 of the guest VMM 109, thereby reflecting the values of the shadow VMCS #1 to the guest VMCS 22. Then, by setting "1" to the entries 12313 corresponding to the virtual VM-exit trigger information which triggers the guest VMM 109 to issue the VMREAD instruction out of the prefetch entry information 1231, the VMREAD/VMWRITE instruction execution module 1225 sets the subject fields of the VMREAD instruction carried out by the host VMM 103 this time to the subject of the prefetch, thereby restraining subsequent VM-exit.

(Details of Processes by Guest VMM)

Figure 13:
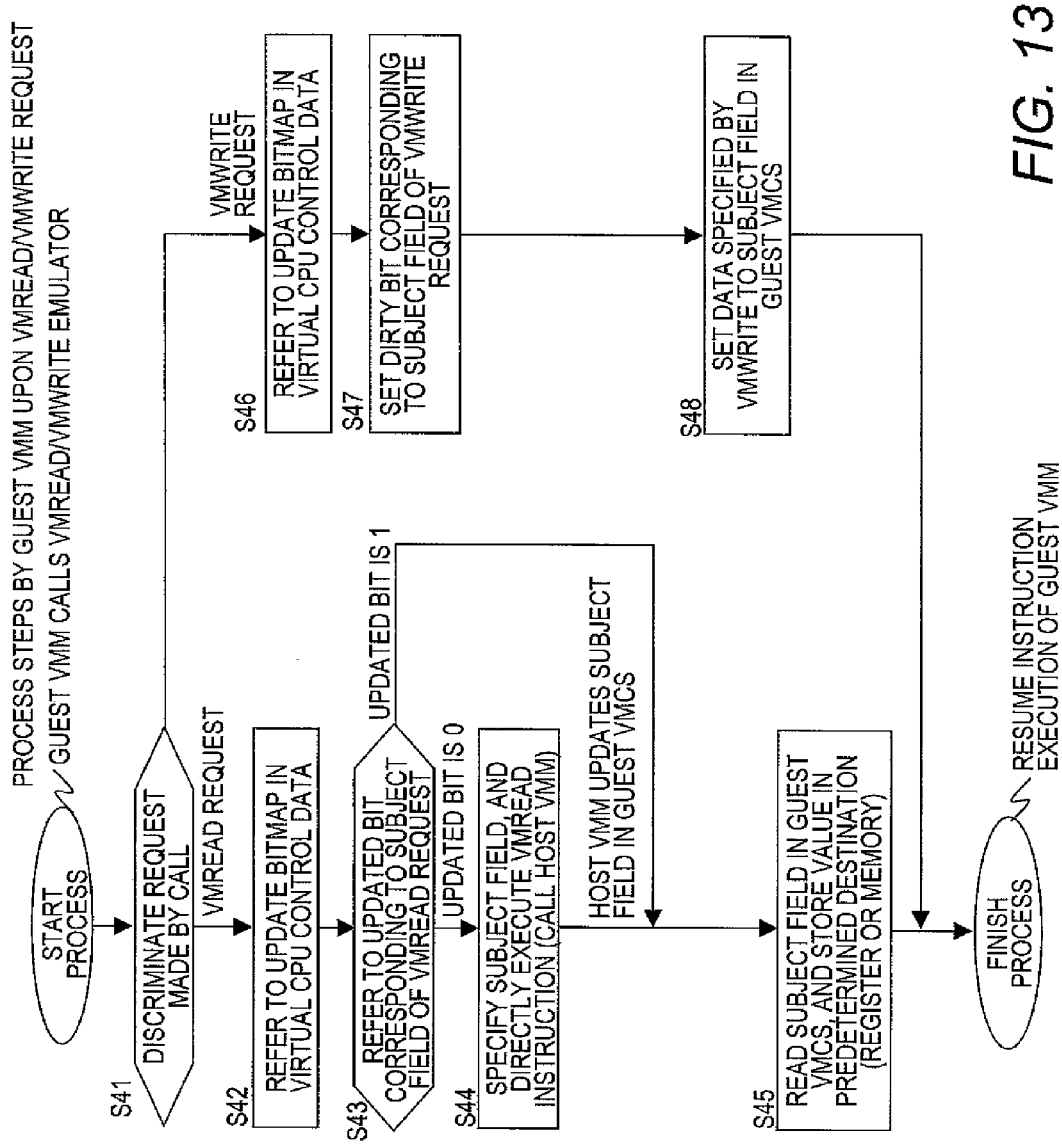
FIG. 13 shows an embodiment of this invention, and is a flowchart illustrating an example of the emulation process carried out by the guest VMM 109.

FIG. 13 is a flowchart illustrating an example of the emulation process carried out by the guest VMM 109. FIG. 13 illustrates an example of the process by the VMREAD emulator 231 and VMWRITE emulator 232 of the instruction code 230 of the guest VMM 109 illustrated in FIG. 3. In FIG. 3, Steps S42 to S45 relate to the VMREAD emulator 231, and Steps S46 to S48 relate to the VMWRITE emulator 232. In this process, the guest VMM 109 starts the emulator in place of execution of the VMREAD instruction or the VMWRITE instruction.

The guest VMM 109 determines whether the request corresponds to the virtual VMREAD or virtual VMWRITE, proceeds to Step S42 in the case of the virtual VMREAD instruction, and starts the VMREAD emulator 231, whereas the guest VMM 109 proceeds to Step S46 in the case of the virtual VMWRITE instruction, and starts the VMWRITE emulator 232.

In the process carried out by the VMREAD emulator 231, in Step S42, the guest VMM 109 refers to the update bitmap 227 of the virtual CPU control data 114. Then, in Step S43, the guest VMM 109 determines whether fields to be read, which are specified by the virtual VMREAD instruction, have "1" in the update state 2273.

When the update state 2273 is "1", for the subject field of the virtual VMREAD instruction, the guest VMM 109 has been updated to the latest value of the shadow VMCS 130 by the prefetch, and thus the guest VMM 109 proceeds to Step S45.

On the other hand, the update state 2273 is "0", to the corresponding field in the guest VMCS 22, the latest value of the shadow VMCS 130 is not reflected, and thus the guest VMM 109 proceeds to Step S44.

In Step S44, the guest VMM 109, in order to read, from the shadow VMCS 130, the field specified by the virtual VMREAD instruction, issues the actual VMREAD instruction (physical VMREAD instruction) to the physical CPU 104.

As a result of the guest VMM 109 actually issuing the VMREAD instruction, the physical CPU 104 generates the VM-exit, thereby passing the control to the host VMM 103. Then, by the process illustrated in FIG. 15, the host VMM 103 reflects the value of the field requested by the virtual VMREAD instruction from the shadow VMCS #1 to the guest VMCS 22, carries out the learning control, and then, passes, by means of the VM-entry instruction, the control to the guest VMM 109.

Then, the guest VMM 109, in Step S45, reads a value of the subject field in the guest VMCS 22 updated with the value of the shadow VMCS 130, thereby reflecting it to a predetermined destination. As the predetermined destination, a general register or the memory is specified.

On the other hand, when the virtual VMWRITE instruction is issued, in Step S46, the guest VMM 109 refers to the update bitmap 227 of the virtual CPU control data 114. In Step S47, the guest VMM 109 sets the dirty state 2274 corresponding to the field specified in the virtual VMWRITE instruction to "1".

Then, in Step S48, the guest VMM 109 writes data specified by the virtual VMWRITE instruction to the field of the guest VMCS 22 specified by the virtual VMWRITE instruction.

In the above-mentioned process, the guest VMM 109 carries out, via the VMREAD emulator 231 or VMWRITE emulator 232, the read from or write to the guest VMCS 22 without generating the VM-exit. Only when the update bitmap 227 contains the update states 2273 whose values are "0", the guest VMM 109 issues the VMREAD instruction, and consequently, the physical CPU 104 generates the VM-exit, and the host VMM 103 starts the above-mentioned VMREAD/VMWRITE instruction execution module 1225 and updates the guest VMCS 22 with the values of the shadow VMCS #1.

SUMMARY

If it is determined that the grandchild OS does not use the virtualization feature in Step S1, or it is determined that the virtual CPU does not use the VT-x feature of the physical CPU 104 in Step S2, the virtual machine process as described in the conventional example of Japanese Patent Translation Publication No. 2005-529401, or "Intel 64 and IA-32 Architectures Software Developer's Manual VOL 2B" may be carried out on the host VMM 103 in Step S15.

In the virtual machine process of Step S15, for example, the grandchild OS 111n of the virtual server 102n illustrated in FIG. 2 is a conventional OS, and if this grandchild OS 111n or the application program 112n (user program) executes a predetermined instruction such as a privilege instruction, as described above, the physical CPU 104 notifies the host VMM 103 of the occurrence of the VM-exit.

When the host VMM 103 receives the notice of the VM-exit from the physical CPU 104, the host VMM 103 stores the status of the user program (virtual CPU 108n) in the guest-state area 131 of the shadow VMCS #n−1. Then, the host VMM 103 sets an address of the pointer 115 to the host-state area in which the status of the host VMM 103 is stored, and carries out a predetermined process.

When the host VMM 103 has completed the predetermined process such as the privilege instruction, the host VMM 103 stores the status of the host VMM 103 in the host-state area 132, sets the address of the pointer 115 to the guest-state area 131, then, issues the VM-entry instruction (VMRESUME instruction), and passes the control to the virtual CPU 108n, thereby resuming the execution of the user program.

In this way, according to this invention, it is possible to integrate a new-generation OS incorporating the virtualization feature and a conventional OS into the single physical server 101, thereby reducing the number of physical servers to reduce the operation/management cost of the servers.

Further, as described above, the host VMM 103 can make it appear to the new-generation OS that the virtual CPU provides the VT-x feature, thereby enabling an OS incorporating a virtualization software program to surely operate. Moreover, with the host VMM 103 according to this invention, there is no overhead caused by the conversion of an instruction sequence as in the conventional simulator, and thus, there is no decrease in the performance of the virtual machine, and the OS incorporating the virtualization feature can be executed on the virtual server.

Then, when the guest VMCS 22 is to be referred to or updated, the virtual VMREAD instruction or virtual VMWRITE instruction is issued, thereby enabling access while the VM-exit is restrained from frequently occurring, which enables an increase in processing capability of the virtual server.

Then, when the VM-exit occurs, in the VMX non-root mode, the prefetch is carried out thereby updating contents of the guest VMCS 22 in a batch with contents of the shadow VMCS #1, and further, the occurrence reason for the VM-exit of this time is learned and reflected to the prefetch entry information 1231 for the subsequent prefetch, which decreases the occurrence of the VM-exit.

Moreover, according to this invention, because there are provided the plurality of shadow VMCSs 130 (#0 to #n−1) in correspondence to the plurality of virtual CPUs 108a to 108n, even when a plurality of guest VMM's 109 are executed on the physical server 101, it is possible to quickly switch a process only by switching the shadow VMCSs 130 (#0 to #n−1). As a result, even if a plurality of new-generation OSs are integrated on the physical server 101, it is possible to maintain the performance of the virtual server.

As described above, according to this invention, because the host VMM 103 monitors the states of the grandchild OS and the application program and the states of the virtual CPUs, thereby rewriting the guest-state area 131 of the shadow VMCS 130, it is possible to surely operate the OS incorporating the virtualization software without decreasing the performance of the virtual server. Then, it is possible to make the new-generation OS incorporating the virtualization feature and a conventional OS to coexist on the single physical server 101, thereby efficiently carrying out the server integration to reduce an operation cost of the server.

Moreover, by using the virtual VMREAD instruction or virtual VMWRITE instruction, the physical CPU 104 can restrain the frequency of occurrence of VM-exit, thereby increasing the processing capability of the virtual server.

It should be noted that the processors described as the physical CPU 104 according to the embodiment may have a configuration of a multi-core processor, and homogeneous or heterogeneous processors may be employed. In other words, when, as the physical CPU 104, a heterogeneous multi-core processor including a plurality of general-purpose processor cores (CPUs) and special-purpose processor cores is used, as long as the general-purpose processor core has the virtualization support feature, this invention can be applied.

As described above, this invention may be applied to a virtual machine system providing a plurality of virtual servers. Moreover, this invention may be applied to a virtual machine manager (VMM) software program for providing a plurality of virtual servers on a physical computer.

While the present invention has been described in detail and pictorially in the accompanying drawings, the present invention is not limited to such detail but covers various obvious modifications and equivalent arrangements, which fall within the purview of the appended claims.

What is claimed is:

1. A control method for a virtual machine system for providing, on a physical computer comprising a physical processor and a memory, a plurality of virtual processors, the virtual machine system comprising:
a first virtualization module for providing a first virtual processor;

a second virtualization module to be executed on the first virtual processor, for providing a second virtual processor; and a user program to be executed on the second virtual processor, the control method comprising the steps of:

holding, by the second virtualization module, first processor control information containing a state of the first virtual processor obtained at a time of execution of one of the second virtualization module and the user program;

holding, by the first virtualization module, second processor control information containing a state of the physical processor obtained at the time of the execution of the second virtualization module, third processor control information containing a state of the physical processor obtained at the time of the execution of the user program, and prefetch entry information in which information to be prefetched in a batch from the third processor control information is set in advance;

detecting, by the first virtualization module, a first event for switching control from the user program to the second virtualization module on the second virtual processor;

reading, by the first virtualization module, upon detection of the first event, the information set in the prefetch entry information out of the third processor control information;

updating, by the first virtualization module, out of the first processor control information, information read based on the prefetch entry information;

setting, by the first virtualization module, the second processor control information for the physical processor to switch the control to the second virtualization module; and referring to, by the second virtualization module, the first processor control information;

wherein the step of updating, by the first virtualization module, out of the first processor control information, information read based on the prefetch entry information comprises a step of setting, by the first vitalization module, an update bitmap for the updated information out of the first processor control information; and the step of referring to, by the second virtualization module, the first processor control information comprises the steps of:

identifying subject information of the referring out of the first processor control information;

referring to the update bitmap, to thereby determine whether or not the identified subject information has been updated;

reading, upon determining that the identified subject information has been updated based on the update bitmap, the first processor control information; and issuing, upon determining that the identified subject information has not been updated based on the update bitmap, a first control instruction, to thereby cause the first virtualization module to reflect the subject information of the referring identified out of the third processor control information to the first processor control information.

2. The control method for a virtual machine system according to claim 1, further comprising the steps of:

carrying out, by the second virtualization module, write to the first processor control information;

detecting, by the first virtualization module, a second event for switching the control from the second virtualization module to the user program;

reading, by the first virtualization module, upon detection of the second event, the updated information out of the first processor control information; and reflecting, by the first virtualization module, the read information to the third processor control information.

3. The control method for a virtual machine system according to claim 1, wherein:

the physical processor comprises a processor compatible with an instruction set of Intel Architecture-32;

the first processor control information, the second processor control information, and the third processor control information each comprise a virtual machine control structure defined in the Intel Architecture-32;

the first control instruction comprises a VMREAD instruction defined in the instruction set of the Intel Architecture-32; and the first event comprises a VM-exit instruction caused by one of a VMRESUME instruction and a VMLAUNCH instruction defined in the instruction set of the Intel Architecture-32.

4. The control method for a virtual machine system according to claim 1, wherein the first virtualization module holds the prefetch entry information as fixed data in the memory.

5. The control method for a virtual machine system according to claim 1, wherein:

the first virtualization module holds the prefetch entry information as data rewritable on the memory; and the step of reflecting the subject information of the referring identified out of the third processor control information to the first processor control information comprises the steps of:

reading, by the first virtualization module, information determined as not having been updated based on the update bitmap from the third processor control information, to thereby reflect the read information to the first processor control information; and adding, by the first virtualization module, to the prefetch entry information, the information which has been read from the third processor control information and has been reflected to the first processor control information.

6. A non-transitory machine readable storage medium recorded with a virtualization program to be executed by a physical computer comprising a physical processor and a memory, for providing a plurality of virtual processors, the virtualization program causing the physical processor to execute the procedures of:

generating, by a first virtualization module, a first virtual processor;

generating, by a second virtualization module, a second virtual processor, and executing, by the second virtual processor, a user program;

holding, by the second virtualization module, first processor control information containing a state of the first virtual processor obtained at a time of execution of one of the second virtualization module and the user program;

holding, by the first virtualization module, second processor control information containing a state of the physical processor obtained at the time of the execution of the second virtualization module, third processor control information containing a state of the physical processor obtained at the time of the execution of the user program, and prefetch entry information in which information to be prefetched in a batch from the third processor control information is set in advance;

detecting, by the first virtualization module, a first event for switching control from the user program to the second virtualization module on the second virtual processor;

reading, by the first virtualization module, upon detection of the first event, the information set in the prefetch entry information out of the third processor control information;

updating, by the first virtualization module, out of the first processor control information, information read based on the prefetch entry information;

setting, by the first virtualization module, the second processor control information for the physical processor to switch the control to the second virtualization module; and referring to, by the second virtualization module, the first processor control information;

wherein the procedure of updating, by the first virtualization module, out of the first processor control information, information read based on the prefetch entry information comprises a procedure of setting, by the first virtualization module, an update bitmap for the updated information out of the first processor control information; and the procedure of referring to, by the second virtualization module, the first processor control information comprises the procedures of:

identifying subject information of the referring out of the first processor control information;

referring to the update bitmap, to thereby determine whether or not the identified subject information has been updated;

reading, upon determining that the identified subject information has been updated based on the update bitmap, the first processor control information; and issuing, upon determining that the identified subject information has not been updated based on the update bitmap, a first control instruction, to thereby cause the first virtualization module to reflect the subject information of the referring identified out of the third processor control information to the first processor control information.

7. The non-transitory machine readable storage medium recorded with a virtualization program according to claim 6, wherein the virtualization program further causes the physical processor to execute the procedures of:

carrying out, by the second virtualization module, write to the first processor control information;

detecting, by the first virtualization module, a second event for switching the control from the second virtualization module to the user program;

reading, by the first virtualization module, upon detection of the second event, the updated information out of the first processor control information; and reflecting, by the first virtualization module, the read information to the third processor control information.

8. The non-transitory machine readable storage medium recorded with a virtualization program according to claim 6, wherein:

the physical processor comprises a processor compatible with an instruction set of Intel Architecture-32;

the first processor control information, the second processor control information, and the third processor control information each comprise a virtual machine control structure defined in the Intel Architecture-32;

the first control instruction comprises a VMREAD instruction defined in the instruction set of the Intel Architecture-32; and the first event comprises a VM-exit instruction caused by one of a VMRESUME instruction and a VMLAUNCH instruction defined in the instruction set of the Intel Architecture-32.

9. The non-transitory machine readable storage medium recorded with a virtualization program according to claim 6, wherein the first virtualization module holds the prefetch entry information as fixed data in the memory.

10. The non-transitory machine readable storage medium recorded with a virtualization program according to claim 6, wherein:

the first virtualization module holds the prefetch entry information as data rewritable on the memory; and the procedure of reflecting the subject information of the referring identified out of the third processor control information to the first processor control information comprises the procedures of:

reading, by the first virtualization module, information determined as not having been updated based on the update bitmap from the third processor control information, to thereby reflect the read information to the first processor control information; and adding, by the first virtualization module, to the prefetch entry information, the information which has been read from the third processor control information and has been reflected to the first processor control information.

* * * * *